(12) United States Patent
Agrawal et al.

(10) Patent No.: US 11,711,396 B1
(45) Date of Patent: Jul. 25, 2023

(54) EXTENDED ENTERPRISE BROWSER BLOCKING SPREAD OF RANSOMWARE FROM ALTERNATE BROWSERS IN A SYSTEM PROVIDING AGENTLESS LATERAL MOVEMENT PROTECTION FROM RANSOMWARE FOR ENDPOINTS DEPLOYED UNDER A DEFAULT GATEWAY WITH POINT TO POINT LINKS

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: AIRGAP NETWORKS INC., Santa Clara, CA (US)

( * ) Notice: Subject to any disclaimer, the term of this patent is extended or adjusted under 35 U.S.C. 154(b) by 0 days.

(21) Appl. No.: 17/888,387

(22) Filed: Aug. 15, 2022

Related U.S. Application Data

(63) Continuation-in-part of application No. 17/521,092, filed on Nov. 8, 2021, which is a continuation of application No. 17/357,757, filed on Jun. 24, 2021, now Pat. No. 11,171,985.

(51) Int. Cl.
*H04L 29/06* (2006.01)
*H04L 9/40* (2022.01)
*H04L 12/46* (2006.01)

(52) U.S. Cl.
CPC ...... *H04L 63/1466* (2013.01); *H04L 12/4641* (2013.01); *H04L 63/1416* (2013.01)

(58) Field of Classification Search
CPC ............. H04L 63/1466; H04L 63/1416; H04L 12/4641
See application file for complete search history.

(56) References Cited

U.S. PATENT DOCUMENTS

| | | | |
|---|---|---|---|
| 6,611,925 B1 | 8/2003 | Spear | |
| 6,914,905 B1 | 7/2005 | Yip et al. | |
| 8,055,800 B1 | 11/2011 | Bardzil et al. | |
| 8,312,270 B1 | 11/2012 | Chou | |
| 8,347,349 B1 * | 1/2013 | Wilson | G06F 21/6218 713/193 |

(Continued)

FOREIGN PATENT DOCUMENTS

| | | |
|---|---|---|
| CA | 2826385 A1 | 8/2012 |
| CN | 109450959 A | 3/2019 |

(Continued)

OTHER PUBLICATIONS

Thapa, Manish, "Mitigating Threats in IoT Network Using Device Isolation", Maste?s Thesis, Feb. 4, 2018, 73 pgs.

(Continued)

*Primary Examiner* — Vance M Little
(74) *Attorney, Agent, or Firm* — Patent Law Works LLP

(57) ABSTRACT

An extended enterprise browser installed on an endpoint device provides protection from ransomware attacks to SaaS and private enterprise applications. The extended enterprise browser monitors for alternate browser installed on the endpoint device. The extended enterprise browser may take one or more actions to block the spread of ransomware by the alternate browser.

18 Claims, 26 Drawing Sheets

(56) References Cited

U.S. PATENT DOCUMENTS

| | | | |
|---|---|---|---|
| 8,683,052 B1 | 3/2014 | Brinskelle | |
| 8,850,185 B1 | 9/2014 | Vaughn | |
| 8,869,259 B1 | 10/2014 | Udupa | |
| 9,225,736 B1 | 12/2015 | Roundy | |
| 9,282,114 B1* | 3/2016 | Dotan | G06F 21/577 |
| 9,306,965 B1 | 4/2016 | Grossman et al. | |
| 9,602,529 B2 | 3/2017 | Jones et al. | |
| 9,712,504 B2 | 7/2017 | Kurmala | |
| 10,298,599 B1* | 5/2019 | Zhang | H04L 63/1416 |
| 10,454,950 B1 | 10/2019 | Aziz | |
| 11,030,311 B1 | 6/2021 | Lopez | |
| 11,093,139 B1 | 8/2021 | Karr et al. | |
| 11,171,985 B1 | 11/2021 | Agrawal | |
| 11,252,183 B1 | 2/2022 | Agrawal | |
| 11,303,669 B1 | 4/2022 | Agrawal | |
| 11,303,673 B1 | 4/2022 | Agrawal | |
| 11,323,474 B1 | 5/2022 | Agrawal | |
| 11,374,964 B1 | 6/2022 | Agrawal | |
| 2003/0212907 A1 | 11/2003 | Genty | |
| 2006/0028996 A1* | 2/2006 | Huegen | H04L 63/126 |
| | | | 370/252 |
| 2007/0101432 A1 | 5/2007 | Carpenter | |
| 2008/0184157 A1* | 7/2008 | Selig | G06F 40/174 |
| | | | 715/781 |
| 2009/0328209 A1* | 12/2009 | Nachenberg | G06F 21/562 |
| | | | 726/22 |
| 2010/0281159 A1 | 11/2010 | Boscolo | |
| 2012/0079122 A1* | 3/2012 | Brown | H04L 12/4641 |
| | | | 709/227 |
| 2013/0298242 A1 | 11/2013 | Kumar | |
| 2014/0020053 A1 | 1/2014 | Kay | |
| 2014/0059642 A1* | 2/2014 | Deasy | H04W 12/00 |
| | | | 726/1 |
| 2015/0281172 A1 | 10/2015 | He | |
| 2016/0197962 A1 | 7/2016 | Winn | |
| 2016/0323318 A1 | 11/2016 | Terrill et al. | |
| 2017/0039310 A1 | 2/2017 | Wang | |
| 2017/0085530 A1 | 3/2017 | Volkov | |
| 2017/0093910 A1 | 3/2017 | Gukal | |
| 2017/0149775 A1 | 5/2017 | Bachar et al. | |
| 2017/0289134 A1 | 10/2017 | Bradley | |
| 2017/0289191 A1 | 10/2017 | Thioux | |
| 2017/0339190 A1 | 11/2017 | Epstein | |
| 2017/0339250 A1 | 11/2017 | Momchilov | |
| 2017/0344743 A1 | 11/2017 | Shi | |
| 2018/0013788 A1* | 1/2018 | Vissamsetty | H04L 63/08 |
| 2018/0097840 A1 | 4/2018 | Murthy | |
| 2018/0189508 A1* | 7/2018 | Li | G06F 21/52 |
| 2018/0324201 A1 | 11/2018 | Lowry | |
| 2019/0116193 A1 | 4/2019 | Wang | |
| 2019/0166152 A1 | 5/2019 | Steele | |
| 2019/0245831 A1 | 8/2019 | Petit | |
| 2019/0253432 A1 | 8/2019 | Ohtani | |
| 2019/0312836 A1 | 10/2019 | Phillips | |
| 2019/0332765 A1 | 10/2019 | Fu | |
| 2020/0137110 A1 | 4/2020 | Tyler | |
| 2020/0145416 A1 | 5/2020 | Mitzimberg | |
| 2020/0228547 A1 | 7/2020 | Kottapalli | |
| 2020/0356664 A1 | 11/2020 | Maor | |
| 2021/0058395 A1 | 2/2021 | Jakobsson | |
| 2021/0136037 A1 | 5/2021 | Balasubramaniam | |
| 2021/0152595 A1 | 5/2021 | Hansen et al. | |
| 2021/0218770 A1 | 7/2021 | Ben-Yosef | |
| 2021/0264233 A1* | 8/2021 | Gronát | G06K 9/623 |
| 2021/0280315 A1 | 9/2021 | Woldenberg | |
| 2021/0344667 A1 | 11/2021 | Huston, III | |
| 2021/0400057 A1 | 12/2021 | Devane | |
| 2022/0217133 A1 | 7/2022 | Montgomery | |
| 2022/0217169 A1* | 7/2022 | Varanda | H04L 63/1425 |
| 2022/0229906 A1 | 7/2022 | Balek | |
| 2022/0360983 A1 | 11/2022 | Raman | |
| 2022/0368689 A1 | 11/2022 | Ben-Noon | |
| 2022/0398321 A1 | 12/2022 | Baldwin | |

FOREIGN PATENT DOCUMENTS

| | | |
|---|---|---|
| CN | 114143034 A | 3/2022 |
| CN | 115396230 A | 11/2022 |
| EP | 1844399 B1 | 6/2019 |
| TW | M623435 | 2/2022 |
| WO | 2005125084 A1 | 12/2005 |
| WO | 2008074621 A1 | 6/2008 |
| WO | 2016191376 A1 | 12/2016 |
| WO | 2018157247 A1 | 9/2018 |
| WO | 2021009645 A1 | 1/2021 |

OTHER PUBLICATIONS

International Search Report and Written Opinion for PCT/US2020/020593, dated Apr. 15, 2020, 8 pgs.

International Preliminary Report on Patentability for PCT/US2020/020593, Completed May 18, 2021, 8 pgs.

* cited by examiner

EXTENDED ENTERPRISE BROWSER BLOCKING SPREAD OF RANSOMWARE FROM ALTERNATE BROWSERS IN A SYSTEM PROVIDING AGENTLESS LATERAL MOVEMENT PROTECTION FROM RANSOMWARE FOR ENDPOINTS DEPLOYED UNDER A DEFAULT GATEWAY WITH POINT TO POINT LINKS

CROSS REFERENCE TO RELATED APPLICATIONS

This application is a continuation-in-part of U.S. patent application Ser. No. 17/521,092, which in turn is a continuation of U.S. patent application Ser. No. 17/357,757, which issued as U.S. Pat. No. 11,171,985, the contents of which are incorporated by reference.

FIELD OF THE INVENTION

The present disclosure generally relates to techniques to protect enterprises from ransomware attacks. More particularly, implementations of this disclosure are related to using an extended enterprise browser to provide lateral movement protection from ransomware attacks.

BACKGROUND

Ransomware is one of the biggest threats facing the security industry today. Businesses have deployed multiple layers of security solutions to defend themselves against ransomware attacks. However, despite this, these attacks continue to occur, and enterprises find themselves in a situation where they either must pay the demanded ransom or risk losing access to critical business assets and data.

One of the problems in enterprise environments is that web browsers are potential vectors for ransomware attacks. In many enterprise environments, employees use a variety of SaaS and private enterprise applications as part of their work. As an illustrative example, an employee in an enterprise environment may use web-based SaaS business software such as customer relation management (CRM) software, sales software, accounting software, etc.

In many enterprise environments, the browser associated with an individual endpoint device may have credentials that allow it to access sensitive enterprise information. If the endpoint is successfully attacked by ransomware, the ransomware has a pathway into the sensitive information available from SaaS applications and private enterprise applications. Once ransomware gains access to a user endpoint, it can take advantage of cached credentials in a web browser to gain further access into corporate information.

Conventional approaches to improve the security of endpoint devices against ransomware attacks are based on endpoint protection solutions. An agent deployed on each endpoint device detects malicious processes being launched and issues an alert. However, agent-based endpoint security solutions deployed on each endpoint device suffers from the following disadvantages. First, deploying and managing these agents is a challenge for IT (Information Technology) organizations. As a result, there is a reluctance amongst IT organizations to deploy new security solutions which rely on endpoint agents. Second, these agents are frequently not supported on older versions of operating systems and can be compromised by attackers thereby circumventing this defense mechanism. Third, endpoint security solutions protect only the endpoint from compromise. Agents report a threat posture to a security provider but do not directly provide protection against ransomware using browser authentication credentials to access data from SaaS and private enterprise applications. Agents offer no protection against data loss and exfiltration when the user accesses SaaS/private enterprise applications.

Implementations of this disclosure were developed in view of some of these problems in the prior art.

SUMMARY

An extended enterprise browser installed on an endpoint device provides protection from ransomware to block attacks from private enterprise applications and SaaS. The extended enterprise browser also monitors for alternate browsers on the endpoint device and take one or more actions to block the spread of ransomware by the alternate browser. The endpoint device may be part of a VLAN having endpoints deployed under a default gateway with point-to-point links.

An example of a method of protecting against lateral propagation of ransom ware includes utilizing an extended enterprise browser, installed on an endpoint device of an enterprise network environment, to block ransomware attacks of private enterprise applications or SaaS applications. The extended enterprise browser, monitors for alternate browsers installed on the endpoint device. In response to the extended enterprise browser detecting an alternate browser, the extended browser taking at least one action to block the spread of ransomware by the alternate browser. In some implementations, the at least one action comprises generating an alert. In some implementations, the at least one action comprises the extended enterprise browser taking an action to block access of the alternate browser to private enterprise applications. In some implementations, the at least one action comprises the extended enterprise browser taking an action to block access of the alternate browser to SaaS Applications. In some implementations, the at least one action comprising the extended enterprise browser communicating during an authentication step that the endpoint is untrustworthy. In some implementations, the endpoint device is provisioned with at least two different client certificates for authentication, and the extended web browser selects a certificate to be used during identity authentication based on a ransomware risk level for at least one of the enterprise and endpoint device.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

In one implementation, an innovative mechanism utilizes an extended enterprise browser as an enforcement mechanism for authenticated access to SaaS/private enterprise applications. The extended enterprise browser has features that allow it to perform various functions that may be used alone or in combination, such as preventing the lateral propagation of ransomware, limiting or blocking access to SaaS and private enterprise applications, and other functions.

In the following examples it will be understood that the extended browser may be used either alone or in combination with a network security appliance for ransomware lateral propagation protection of SaaS and Private Applications from endpoints deployed under a default gateway with point-to-point links. That is, the extended enterprise browser may be installed on an endpoint device of a network having a network security appliance for ransomware lateral propagation. The two techniques for network protection may be used together as part of one comprehensive solution, although they may also be used independently.

Example Security Appliance of U.S. Pat. No. 11,171,985

Figure 1:
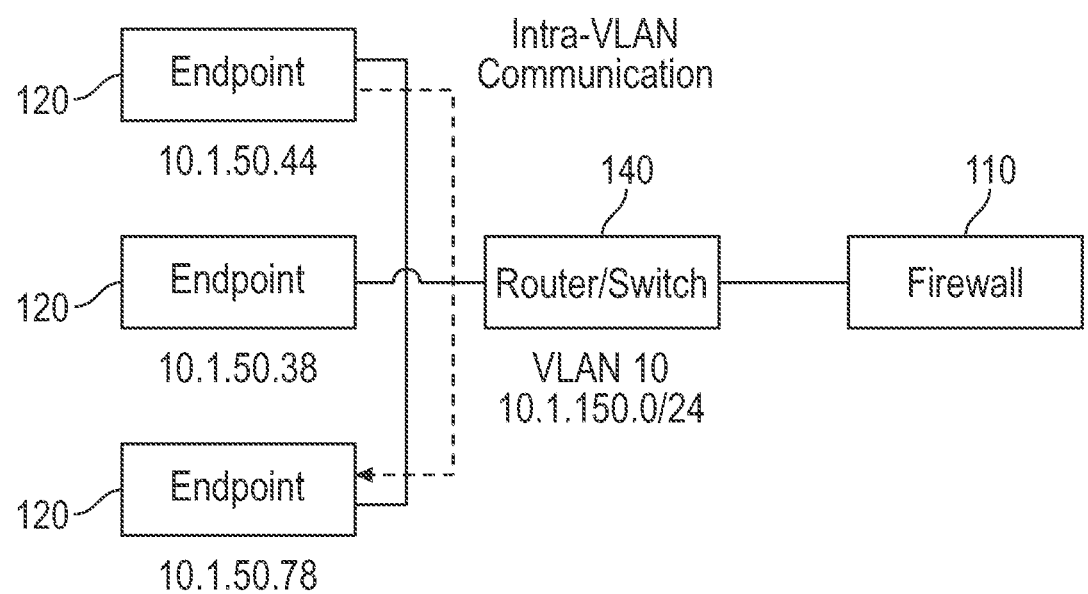
FIG. 1 is a block diagram illustrating Intra-LAN traffic in a conventional VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices, Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

Figure 2:
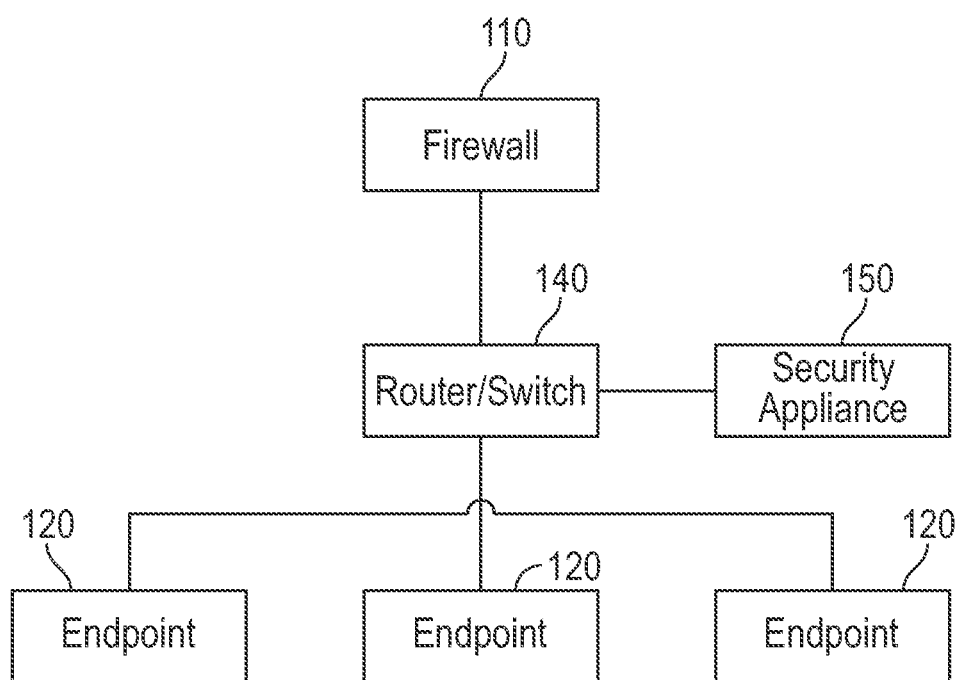
FIG. 2 is a block diagram illustrating a security appliance to provide protection from lateral movement of ransomware in accordance with an implementation.

FIG. 2 is a diagram illustrating a change to a nets network architecture to prevent lateral propagation of malware and ransomware. The operation of the network router/switch 140 is augmented and enhanced with a security appliance 150.

The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security application 150 may be implemented as software compatible with a virtual machine (VM) implementation, such as within a hypervisor implementation in VMware®. The security appliance may be deployed on a port that allows the security application to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) server responsible for dynamically assigning an IP address and other network configuration parameters to each endpoint device on the network so that they communicate with each other in the existing VLAN network.

When an individual endpoint 120 requests an IP address, the security appliance 150 responds back with an IP address and a subnet mask that sets the security appliance as the default gateway for the endpoint. In one implementation, the security appliance responds with a subnet comprised of all ones-255.255.255.255-that sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255. 255.255 puts each device inside its own subnet, which forces them to communicate with the default gateway before communicating with any other device, The 255.255. 255.255 subnet mask may also he referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
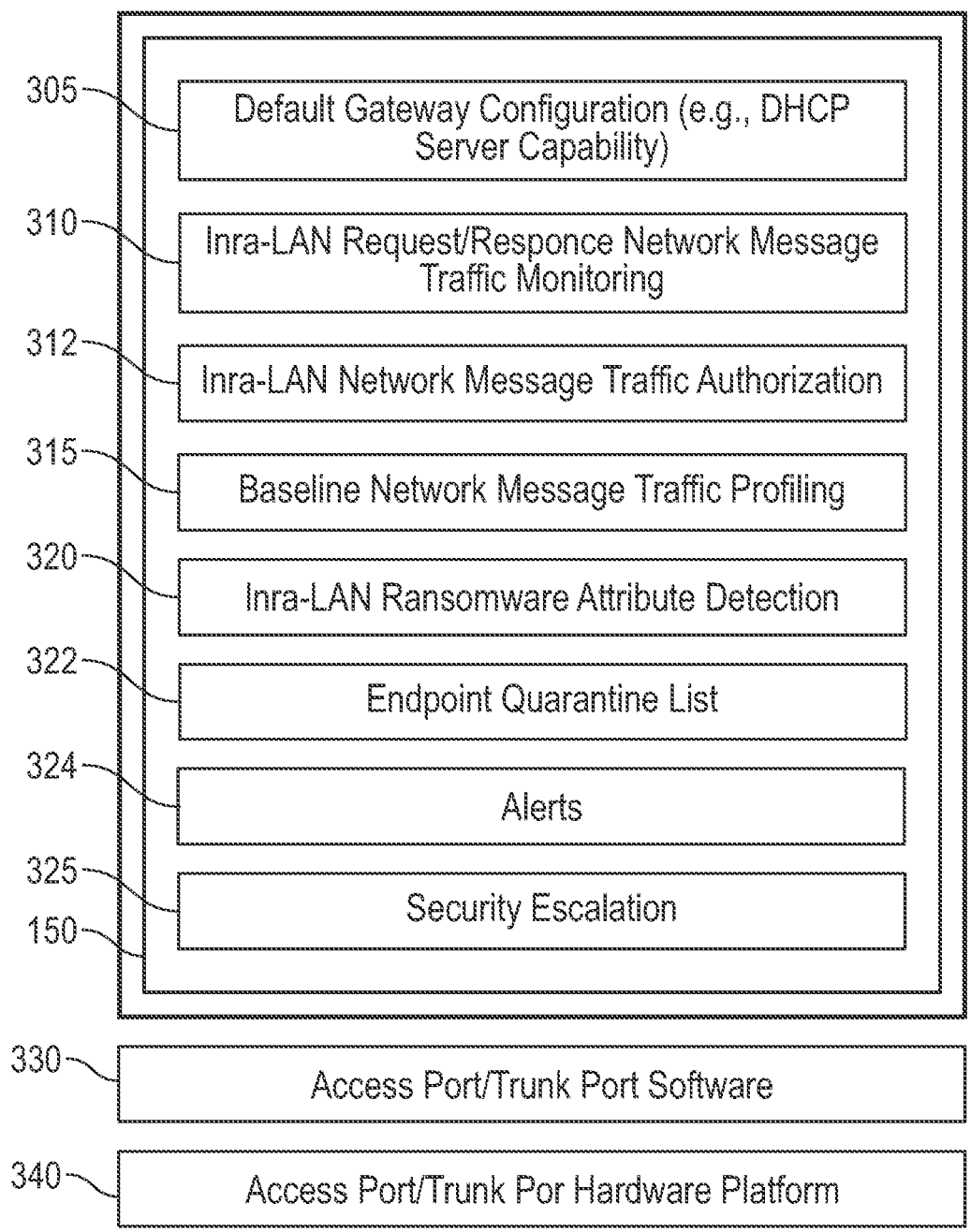
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransom ware). An alert unit 324 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
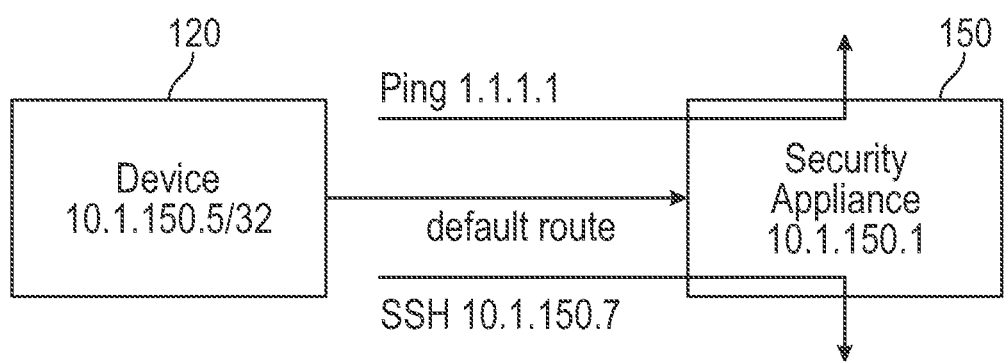
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
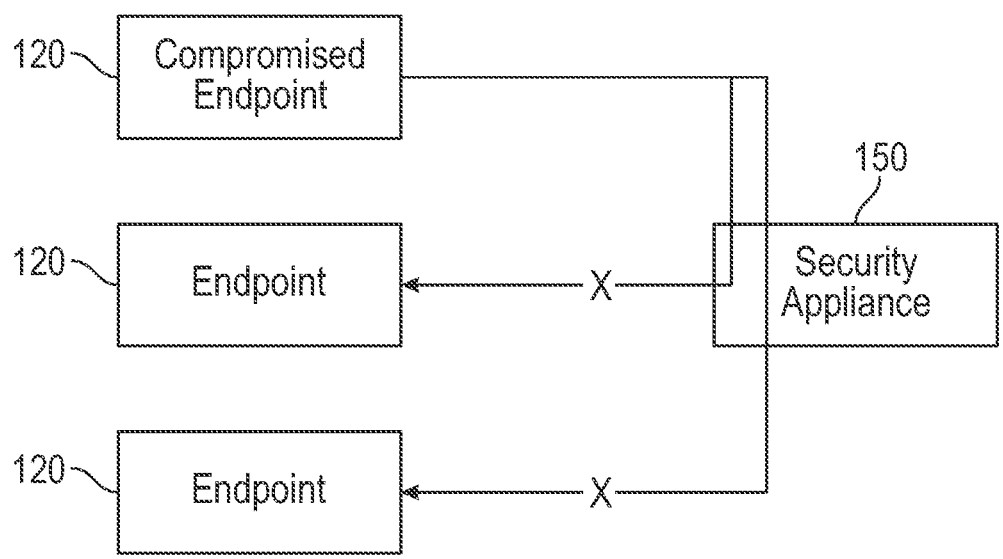
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
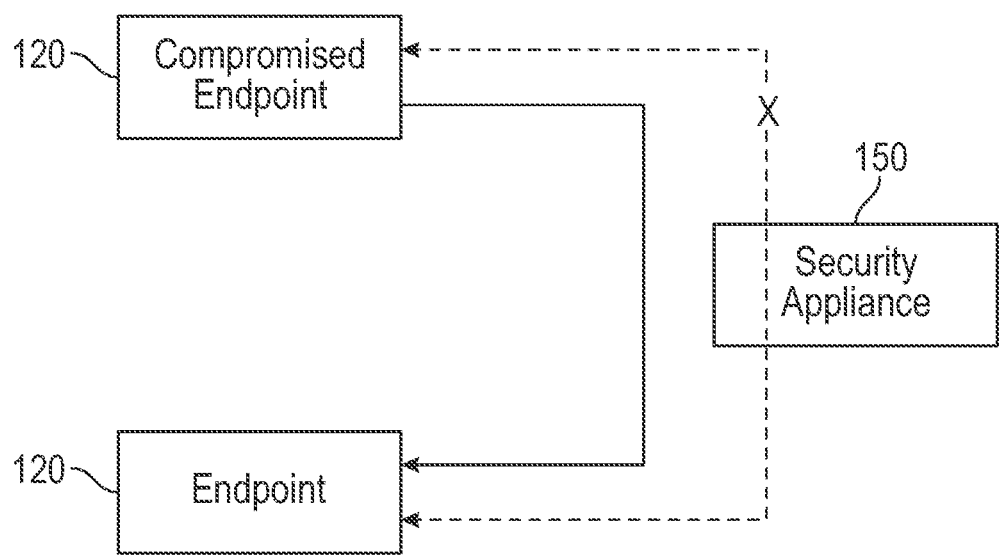
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
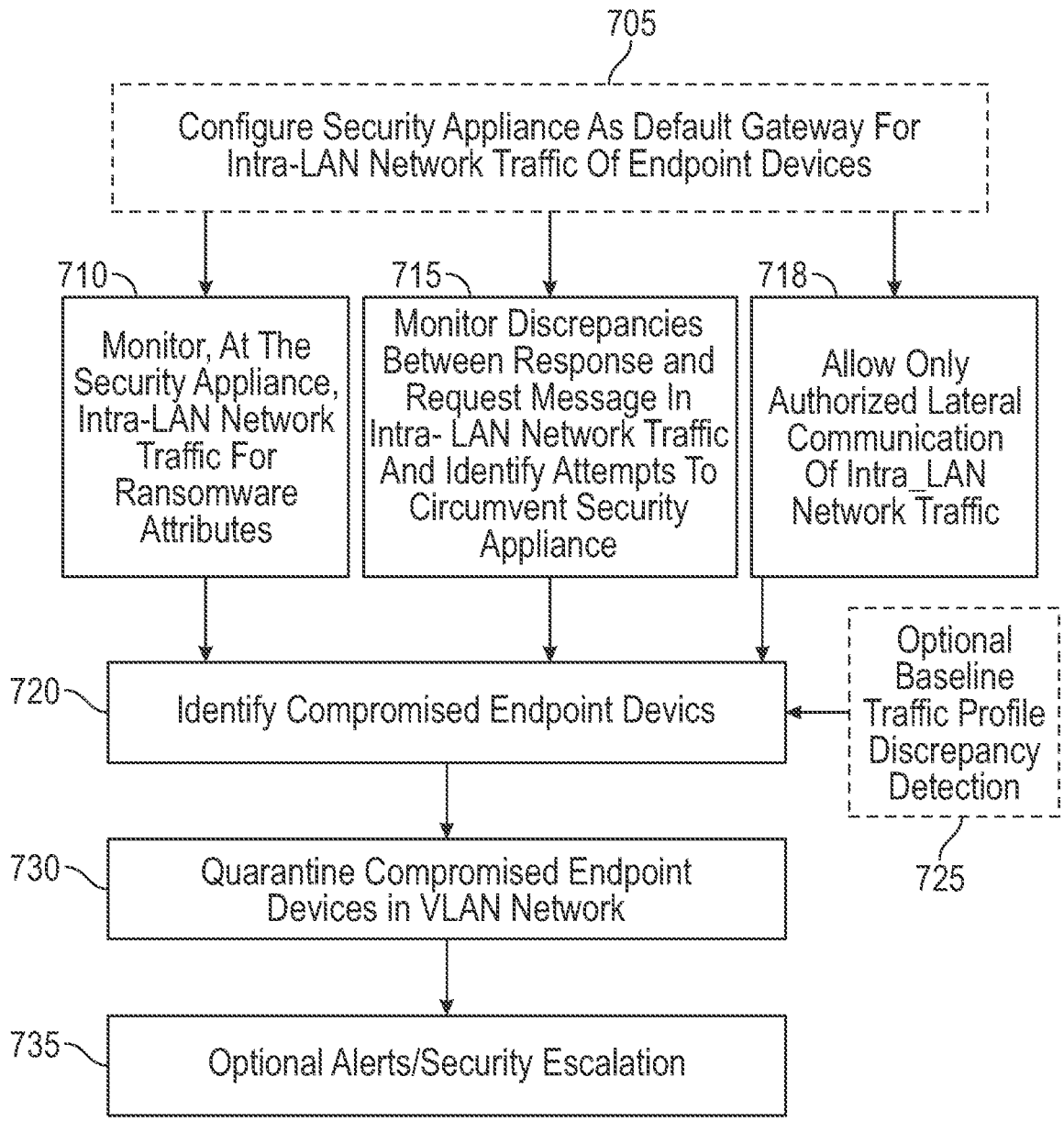
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. Ha compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

Extended Browser Examples

Figure 8A:
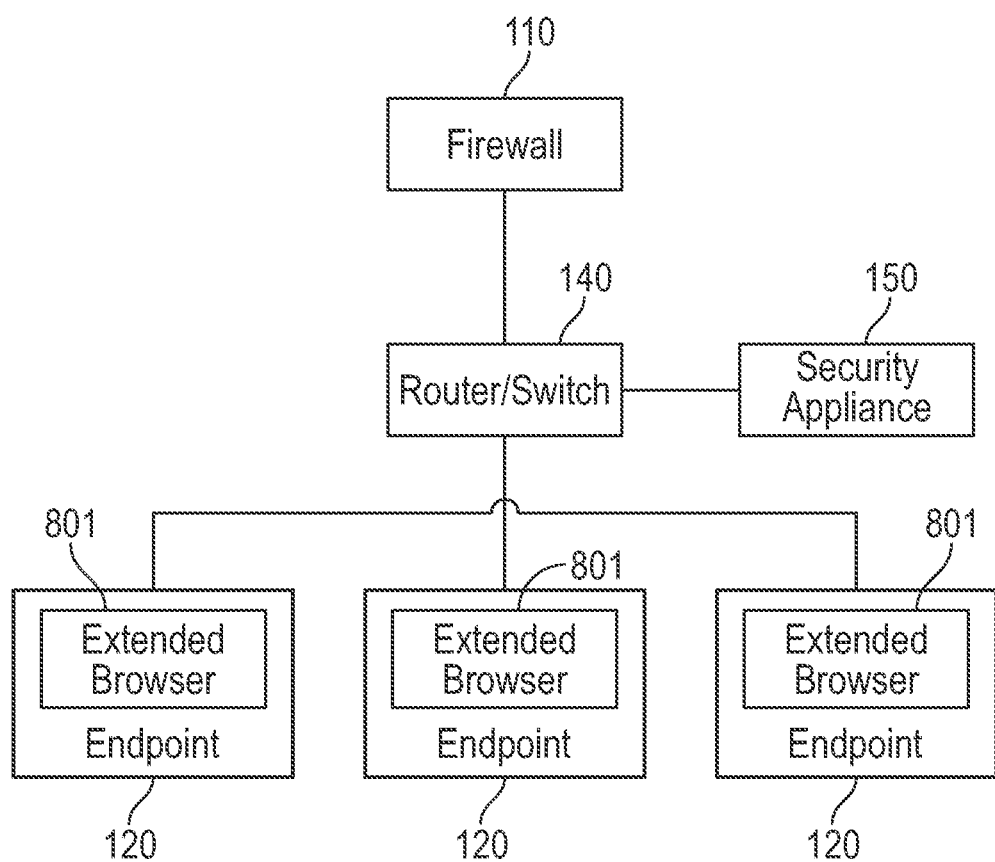
FIG. 8A illustrates the use of an extended browser for endpoints deployed under a default gateway in accordance with an implementation.

As illustrated in FIG. 8A, an additional layer of ransomware protection can be provided using an extended browser in the previously discussed examples that used a security appliance.

Figure 8B:
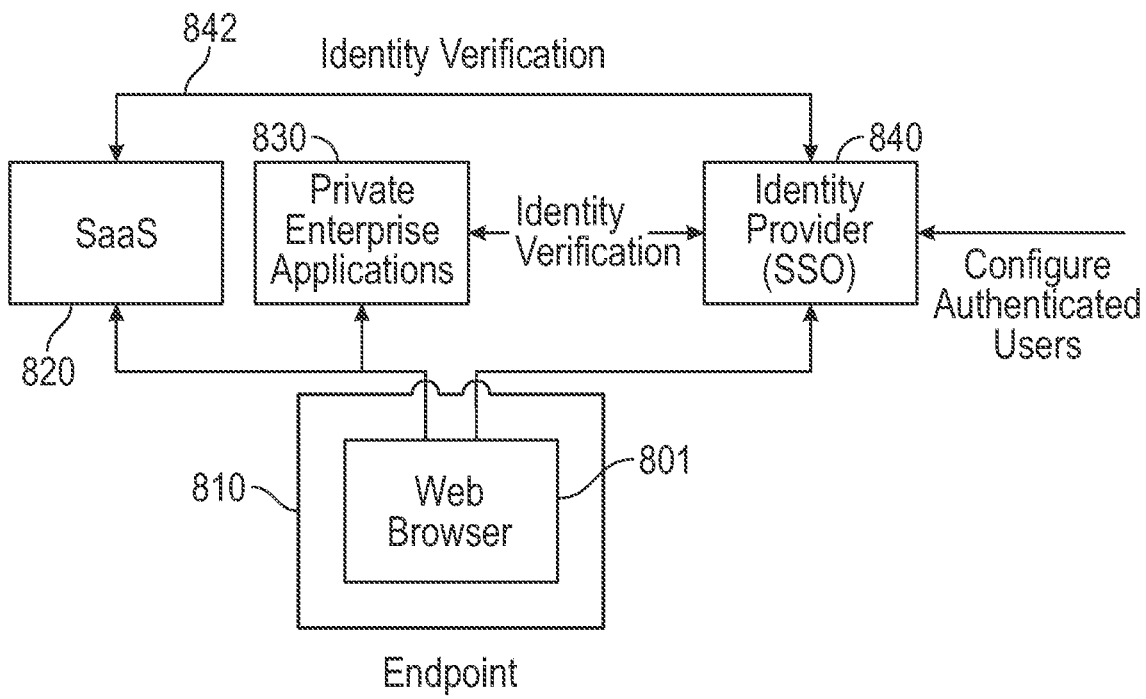
FIG. 8B illustrates a general enterprise environment in which a browser at an endpoint device is used to access SaaS and private enterprise applications.

A security appliance may be used to provide a layer of protection of ransomware from lateral propagation. FIG. 8B illustrates an example of an enterprise network environment in which a user utilizes a web browser 801 operating from an endpoint device 810 to access a. variety of Software as a Service (SaaS) 820 and private enterprise applications 830. The endpoint device 810 may, for example, be a computer device (e.g., a laptop computer, notebook computer, tablet device, etc.). Most enterprise organizations use Single-Sign On (SSO) based Identity Providers 840 to authenticate end users when they attempt to access SaaS/Private Applications 820, 830 from their web browser 801. The identity provider authenticates 842 users of SaaS and private enterprise applications.

Figure 8C:
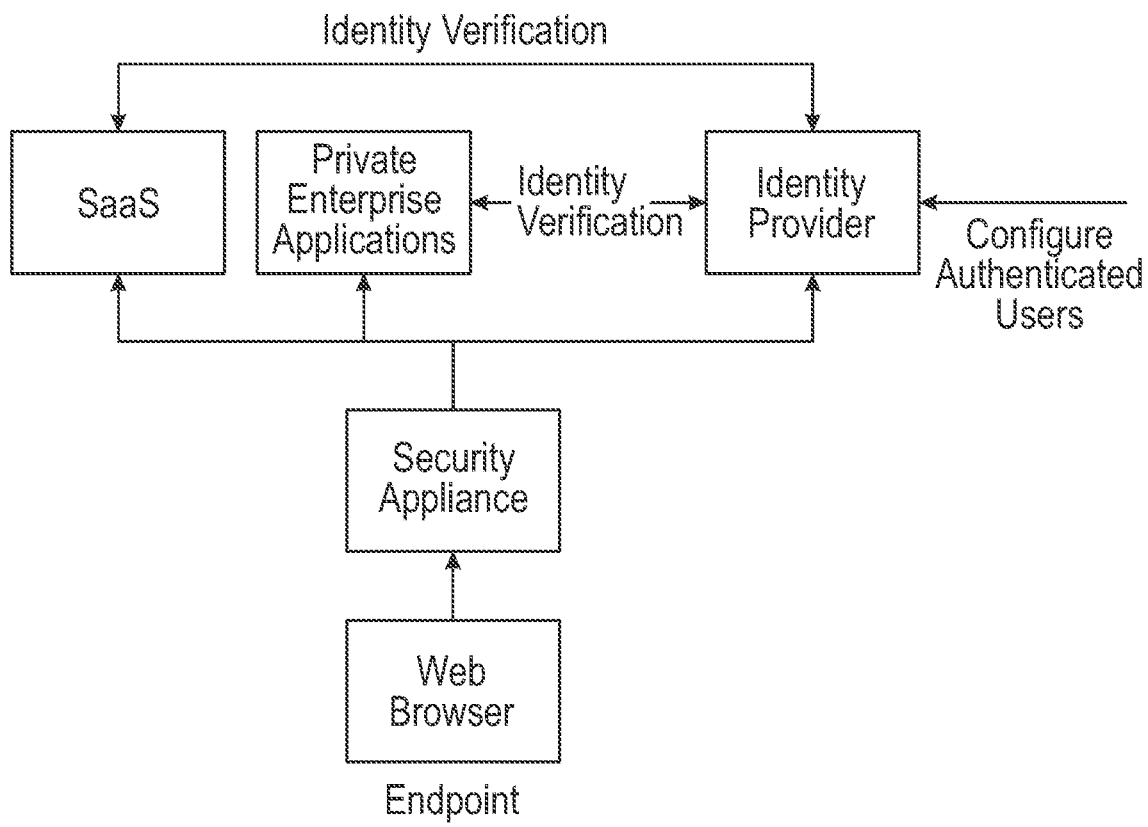
FIG. 8C illustrates the general enterprise environment of FIG. 8B with an additional security appliance for protection of point-tip-point links to endpoints.

As illustrated in FIG. 8C, an additional layer of network protection may be provided by a network security appliance similar to that previously discussed. The security appliance may provide various types of protection against lateral propagation of ransomware between point-to-point links of a shared network by implementing a default gateway. As an illustrative but non-limiting example, a medium-size company could have hundreds of employees, each operating an endpoint device. A network security appliance may provide a certain degree of lateral ransomware protection. However, as discussed below in more detail, an extended browser operating on individual endpoint devices provides an additional type of protection against ransomware associated with user actions such as interacting with SaaS and private enterprise applications.

Authentication and authorization for end users can be configured by an IT organization in the Identity Provider 840. However, existing web browsers such as Google Chrome®, Firefox® and Microsoft Edge® do not allow IT organizations to control and configure end user access to SaaS 820 and private enterprise applications 830 based on an enterprise organization threat level or the security posture of the user endpoint 810. This leaves IT organizations vulnerable to data loss and exfiltration by ransomware and malware attacks when the user's endpoint is compromised. The user's endpoint can become compromised in various ways, including through lateral propagation of ransomware within an enterprise.

In recent years the web browser has become the de facto standard for accessing SaaS/private enterprise applications. The web browser is by default included on every enterprise user's endpoint and is almost always running irrespective of whether the user is actively using it. For example, an employee may launch their browser at the start of the work day and leave it running even if they spend most of the day doing tasks that don't require the browser. Moreover, Single Sign On (SSO) authentication has become widely adopted industry to securely authenticate users with multiple applications and websites by using just one set of credentials. In SSO authentication, client certificates are used to bind the user authentication. However, if ransomware/malicious actors acquire the client certificates, they can then access sensitive enterprise data stored by SaaS and private enterprise applications.

SSO establishes a trust relationship between three distinct entities-the application (service provider), the identity provider (e.g., OneLogin® or Okta®) and the end user (the requester or web browser client). This trust relationship is based on certificates exchanged between the identity provider and the service provider so that the service provider knows the information from the identity provider is coming from a trusted source. Further there is a trust relationship between the identity provider and the end user, either by verifying end user credentials or certificates assigned to the end user.

When a user tries to access a SaaS or a private enterprise application over the HTTPS protocol, as part of the underlying TLS (Transport Layer Security) handshake, the web server sends over a digitally signed certificate to prove its authenticity. This certificate is signed by a trusted certificate authority (CA) and the client checks to see if the certificate of the issuing CA was issued by another trusted CA and so on until the end of the certificate chain. The top of the chain is the root certificate, which is issued by a trusted Certificate Authority. This entire chain of certificates is typically stored securely in the underlying operating system.

However, this root certificate chain stored in the underlying operating system can be compromised by a malicious attacker who can then insert a fake certificate into this chain. By doing this, they can introduce a man-in-the-middle proxy which can then be used to decrypt the end user traffic destined to SaaS/private enterprise applications. Since the MITM (Man in the Middle) proxy issues its own certificate with fake root certificates, the client endpoint trusts this due to its compromised root certificate store.

Once the MITM proxy is trusted by the client web browser, it can decrypt traffic intended for secure applications and compromise sensitive data.

Figure 9:
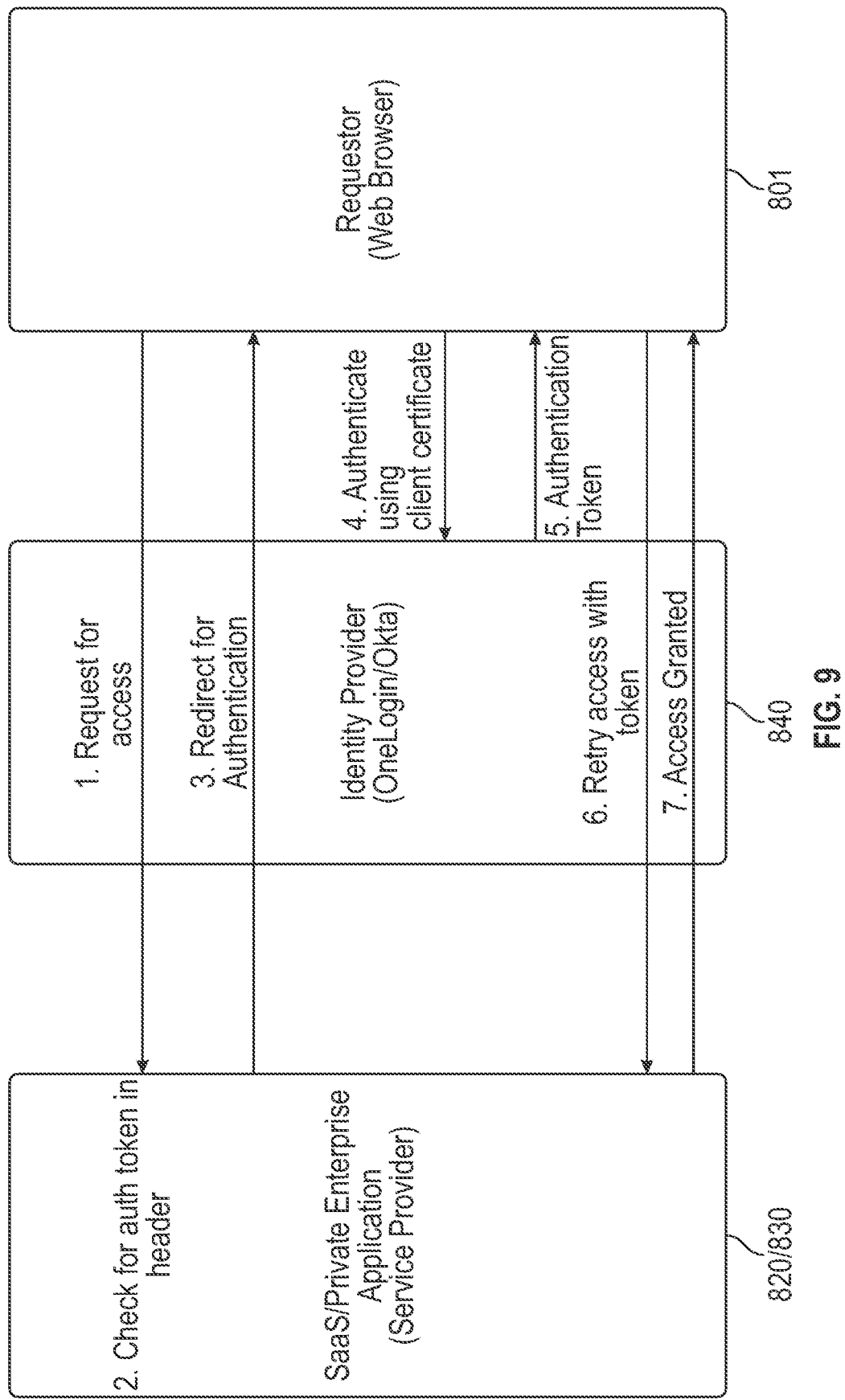
FIG. 9 illustrates the use of client certificates for authentication to SaaS and private enterprise applications using an identity provider in the enterprise environment of FIG. 8.

FIG. 9 is an interaction diagram illustrating a simplified representation of user access to a SaaS or a private enterprise application that has been configured for single sign on or SAML authentication.

In step 1, the user's web browser 801 first sends a HTTPS request to access the SaaS/private enterprise applications 820/830 which have been configured for Single Sign on (SSO) or SAML based authentication.

In step 2, the SaaS/private enterprise applications checks if the request has been authenticated by the identity provider (by looking for the presence of a bearer or authentication token in the HTTPS header). If authenticated, the user is granted access to the application.

If not, in step 3, the user is redirected to the identity provider service which is most commonly the SSO provider. Normally the user is authenticated by the identity provider based on credentials and/or multi-factor authentication. Alternatively, the SSO provider can be configured to authenticate the requestor based on client certificate verification.

In step 4, user's web browser then sends the client certificate to the identity provider service which verifies the certificate using public-private key based authentication.

In step 5, once the certificate has been authenticated, the identity provider service returns an authentication token back to the requestor (client web browser).

In step 6, the requestor retries the access to the SaaS/private enterprise applications with the authentication token and is granted access to the application.

Figure 10A:
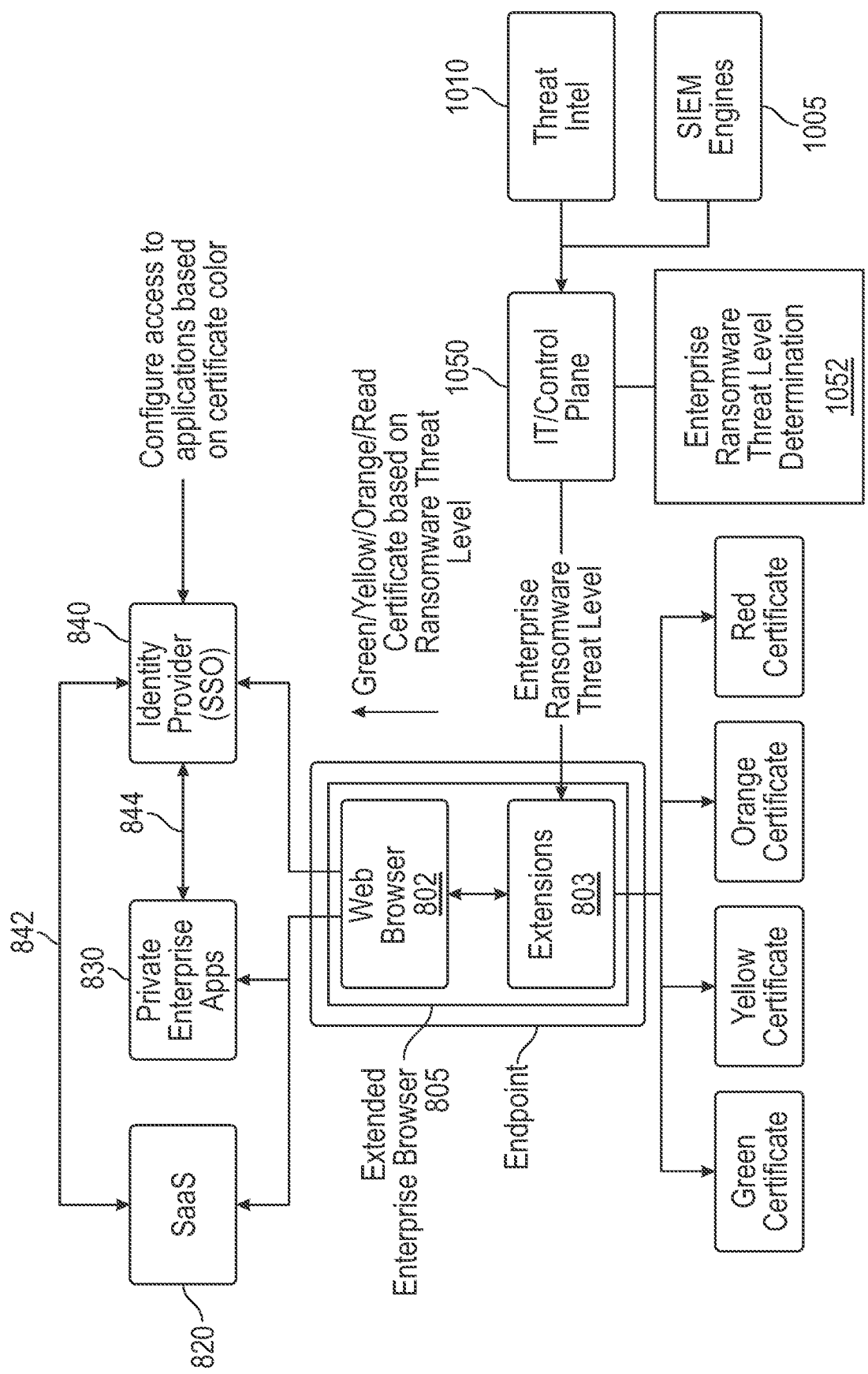
FIG. 10A illustrates an example of an extended enterprise browser having at least two different security certificates for different enterprise ransomware threat postures in accordance with an implementation.

Extensions To Browsers To Implement Modified Authentication Workflow Based on Ransomware Threat Level Referring to FIG. 10A, in one implementation an extended enterprise browser 805 is installed on an endpoint device in an enterprise network environment. For the sake of illustration, conventional aspects of the enterprise network environment are omitted. In an enterprise network environment, there are typically many individual endpoint devices (e.g., laptop computers, notebook computers, tablet computers, etc.) each of which has a memory, process, display, etc. An individual endpoint device may have a browser installed from which SaaS applications and private enterprise applications may be accessed by a user. Ransomware may attempt to attack individual endpoints. However, as enterprise use SaaS applications and private enterprise applications to handle and store sensitive data, ransomware may also target endpoints to attempt get to get the credential to access data associated with SaaS applications and private enterprise applications.

In one implementation, the extended enterprise browser 805 is based on an open source browser 802 with additional browser extensions 803 to the open source code added to aid in preventing malware/ransomware attacks in an enterprise environment. This results in an extended web browser that provides conventional web browsing features but extended with one or more additional functionalities to aid in protecting an enterprise from ransomware/malware attacks. Conventional browsers, such as Google Chrome®, were not designed to specifically address some of the ransom ware attack vectors of enterprise organizations.

In one implementation, the extended enterprise browser 805 has one or more extensions of 803 of the open source code of an open source browser 802 to increase protection against malware/ransomware in an enterprise environment. In one embodiment, an end user may install the browser extensions on their endpoint device to provide additional protection against ransomware. This may include using the one or more extensions 803 to perform a variety of functions discussed below, including securely storing a set of different authentication certificates for an endpoint to authenticate a user with an identity provider 840 based on an enterprise organization's threat level or an endpoint security posture level.

The extended enterprise browser 805 may be based on an open source browser such as Chromium®. For example, Chromium® is an open-source browser upon which the popular Google Chrome is based upon. The open source code of the browser can be modified.

The Chromium Project® has a developer's section with reference materials, code downloads, development guides, and guides for developing new code as extensions to the browser. Other open source browsers also permit software developers to develop compatible browser extensions within an open source environment that provides reference code, development guidelines, APIs, and development support services.

As of 2022, Google Chrome® contains 35 million lines of code. In theory, a large organization like Google® could develop an extended enterprise browser 805. However, using an open source browser like Chromium® permits developers to extend the functionality of open source browsers like Chromium® by modifying the open source code. in some implementations of the present disclosure, an open-source browser, such as Chromium, has the open-source code modified with one or more extensions 803 specifically designed to improve protection against ransomware in enterprise environments. The additional extensions 803 result in an extended enterprise browser 805 that addresses ransomware attack vectors for enterprise environments that have arisen from the fact that modem enterprises increasingly use SaaS 820 and private enterprise applications 830 that access, store, or generate various types of sensitive enterprise data.

The extended enterprise browser 805 may be implemented as one or more extensions 803 of the open source code of an open source browser 802. It will thus be understood throughout the following discussion that the open source browser 802 supports conventional browser functions while the one or more extensions 803 provide additional ransomware protection. The extended browser 805 may be installed on an endpoint device of an enterprise network, such as on a user's laptop computer, notebook computer, etc. In the following discussion it will be understood that the overall functionality of the extended browser 805 may be discussed, although it is the one or more extensions 803 that support additional modes of operation to provide additional protection against ransomware.

Referring to FIG. 10A, various threat postures, or threat risk levels, due to lateral propagation of ransomware can be supported by one or more extensions 103 of the open source browser 802 of the extended enterprise browser 805. The threat level may, for example, be determined by an IT/Control plane receiving information indicative of potential threats. As an example, the IT/control plane 1050 may receive threat intelligence 1010 and/or by a security information and event management (STEM) engine 1005.

The determination of the threat level may also optionally include factors specific to a particular enterprise. For example, some types of enterprises are more likely to be targets of ransomware attacks or have greater downside risks to some types of ransomware attacks.

The IT/control plane may make determinations of a threat level with different degrees of supervision by a human IT manager. For example, a human IT manager may desire to exercise various degrees of supervision or control. However, an algorithm 1052 may be used, if desired, to receive the available threat information and automatically determine a malware/ransomware threat level. For example, a classification algorithm may analyze the available information and classify the threat level in one of a set of levels (e.g., high/low, high/medium/low, very high/high/medium/low, etc.).

As discussed below in more detail, in some implementations, the endpoint device receives a threat level from an IT/control plane and adapts its security response based on the received threat level. However, more generally, the received threat level may be a factor that the endpoint device takes into account with other information.

In one implementation, the extended enterprise browser 805 selects a certificate based on the corresponding threat level. Each threat level has a corresponding certificate. For example, there may be N different threat levels and a corresponding N number of endpoint certificates, where N is a positive integer greater than or equal to 2. As one example, with 4 different threat levels (e.g., very high, high, medium, and low) there may be four corresponding certificates (e.g., red, orange, yellow, and green with each threat level. In some implementations, each threat level is assigned a particular color or label: green, yellow, orange and red. In one implementation, an IT organization provisions user endpoints with different certificates to correspond to each risk level. These certificates can be labeled in a similar fashion: green, yellow, orange and red.

During the authentication procedure, the identity provider 840 is provided by the secure web browser 105 with the certificate appropriate for the threat level. Each of these endpoint certificates can have a unique subject name (or other unique identifier) to allow the identity provider to determine access to certain SaaS/Private applications based on the threat level, For example, some SaaS/Private applications may have more access to sensitive/valuable enterprise data than other applications such that the downside risk of a ransomware attack is greater. Alternatively, there may be aspects of individual SaaS/Private applications that pose greater downside risks for a ransomware attack.

In one implementation, during normal operation the extensions 803 of the source code of an open source browser 802 will use the green (lowest threat level) endpoint certificate to the authentication provider. This will result in the user being allowed access to all allowed SaaS/private enterprise applications. However, if the organization is deemed to be at high risk due to lateral propagation of ransomware using one of the mechanisms detailed below, the extensions to the web browser will use a higher threat level certification (e.g., a yellow, orange, or red endpoint certificate) to authenticate the user to the identification provider. The identity provider, in response, configures access to applications based on the corresponding threat level of the certificate. This will result in the user being denied partial or complete access to SaaS/private enterprise applications based on the security configuration at the identity provider. The identity provider 840 can be configured to pass the device context/threat posture to the SaaS/Private application. For example Okta, an identity and access management software company, offers Okta Limited Access. Okta Limited Access allows Okta to be configured to pass device context to certain Security Assertion Markup Language (SANE) applications through the SAML assertion exchanged during authentication. The applications can then, in turn, use that device context information to limit access to certain application specific behaviors, including permission to edit/download files from the application. Some examples of the type of device context that can be passed include: trusted, untrusted, and unknown. More generally, a device attribute statement can be passed with one or more attribute values.

Figure 10B:
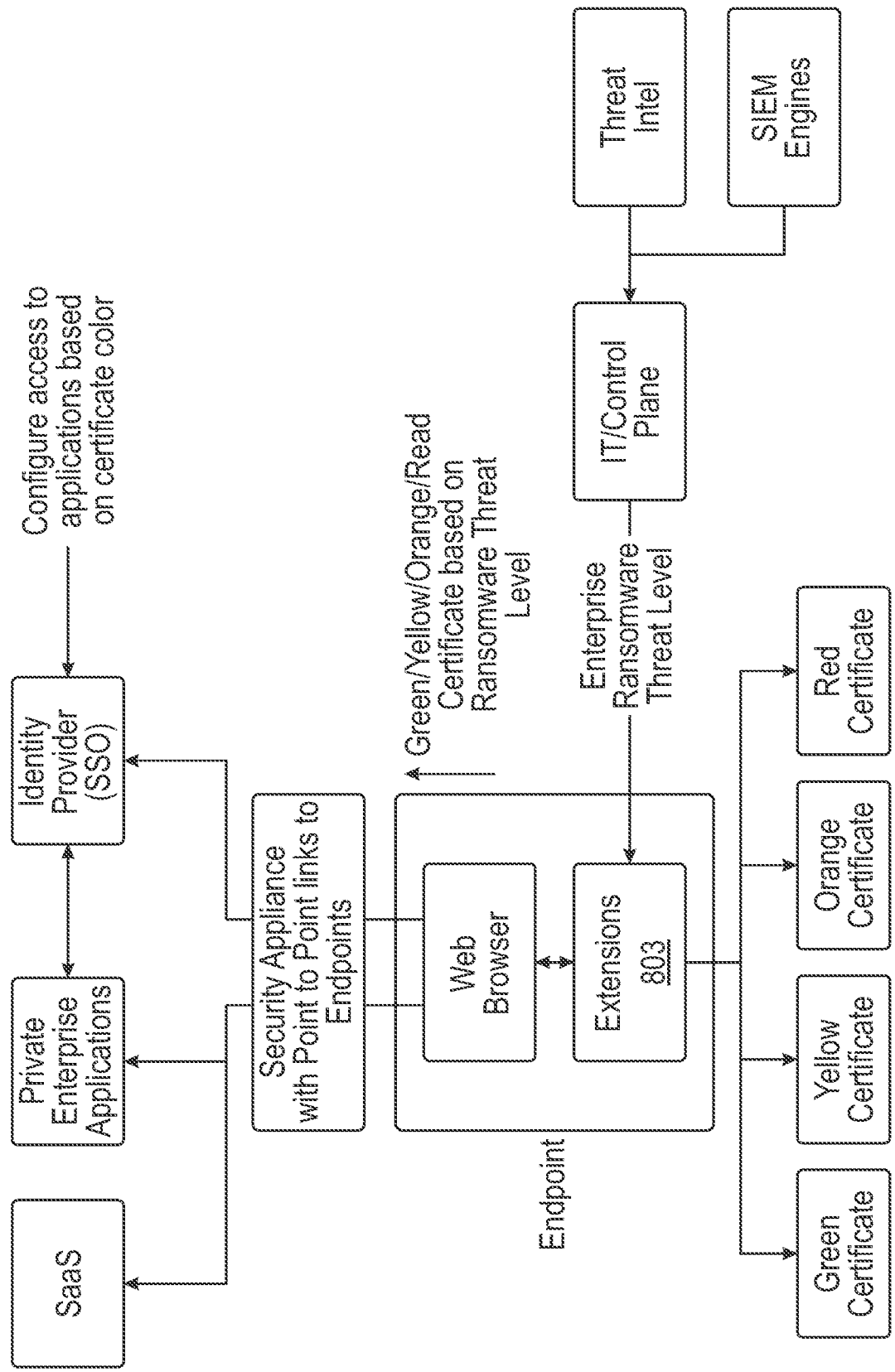
FIG. 10B illustrates an example of the extended enterprise browser of FIG. 10A deployed in a network environment with an additional security appliance for protection of point-to-point links to endpoints.

As illustrated in FIG. 10B, this approach may be used in combination with the security applicant which was previously discussed.

Figure 11:
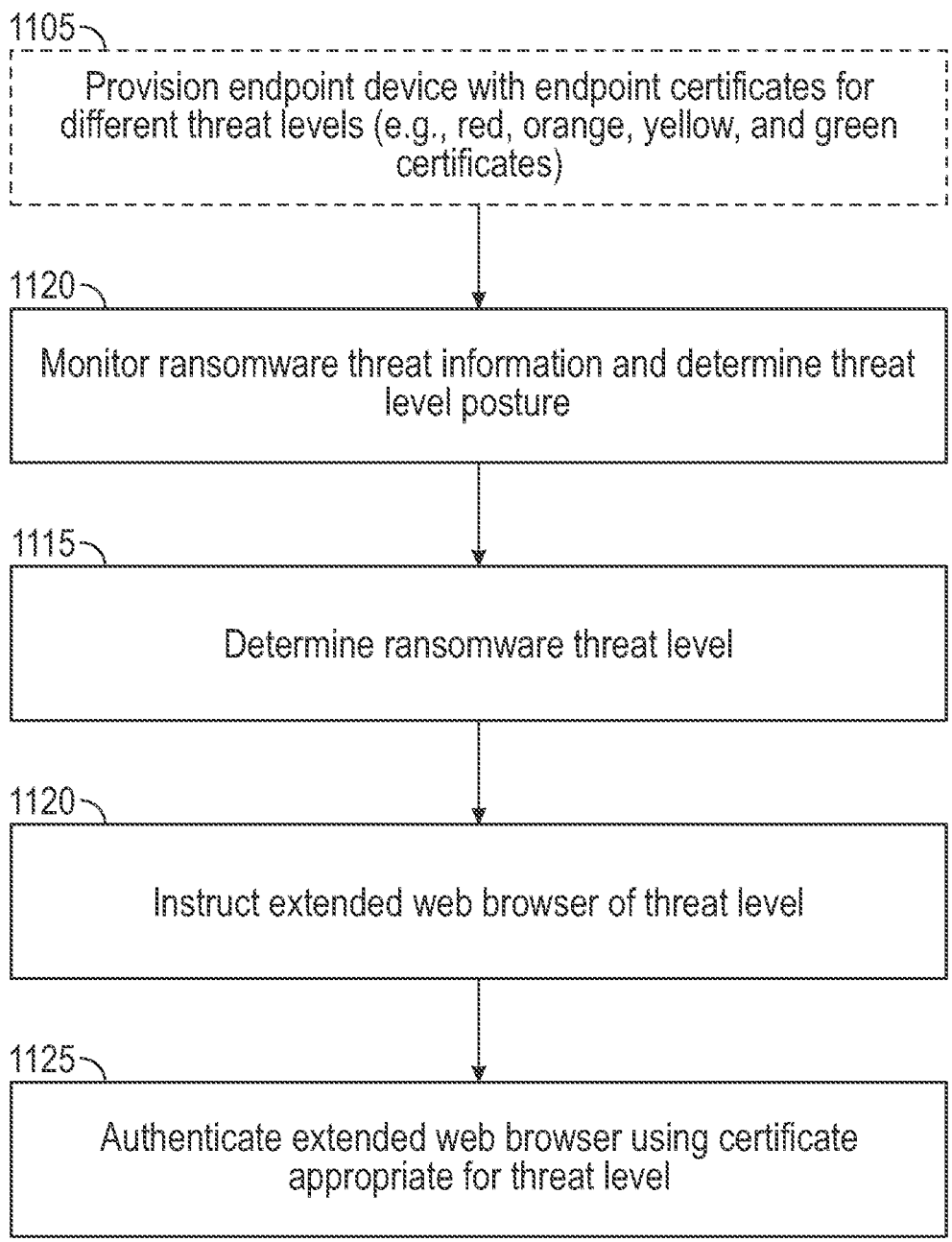
FIG. 11 is a flow chart illustrating a method of authenticating an extended enterprise browser using a certificate appropriation for a ransomware threat level in accordance with an implementation.

As illustrated in the flowchart of FIG. 11, a high level method may include in step 1105 provisioning an endpoint device with certificates for different threat levels. In step 1115, monitoring is performed of ransom ware threat information to determine a threat level posture. This may include analyzing threat intelligence, information for SIEM engines, or other sources. This analysis of threat intelligence may be performed by IT administrators or by using an algorithm to automatically assign a threat level. The available threat information is used to determine a threat level, which is communicated in step 1120 to the endpoint device/browser. In step 1125, during an authentication process, the web browser uses the certificate appropriate for the threat level.

While a single endpoint device is illustrated in FIG. 10, more generally an enterprise may have a large number of endpoint devices, each having a browser with at least one browser extension installed. Thus, all of the endpoint devices in an enterprise that provide browser access to SaaS and private enterprise applications may be protected in a similar manner.

Generating Certificates for Different Threat Levels

Figure 12:
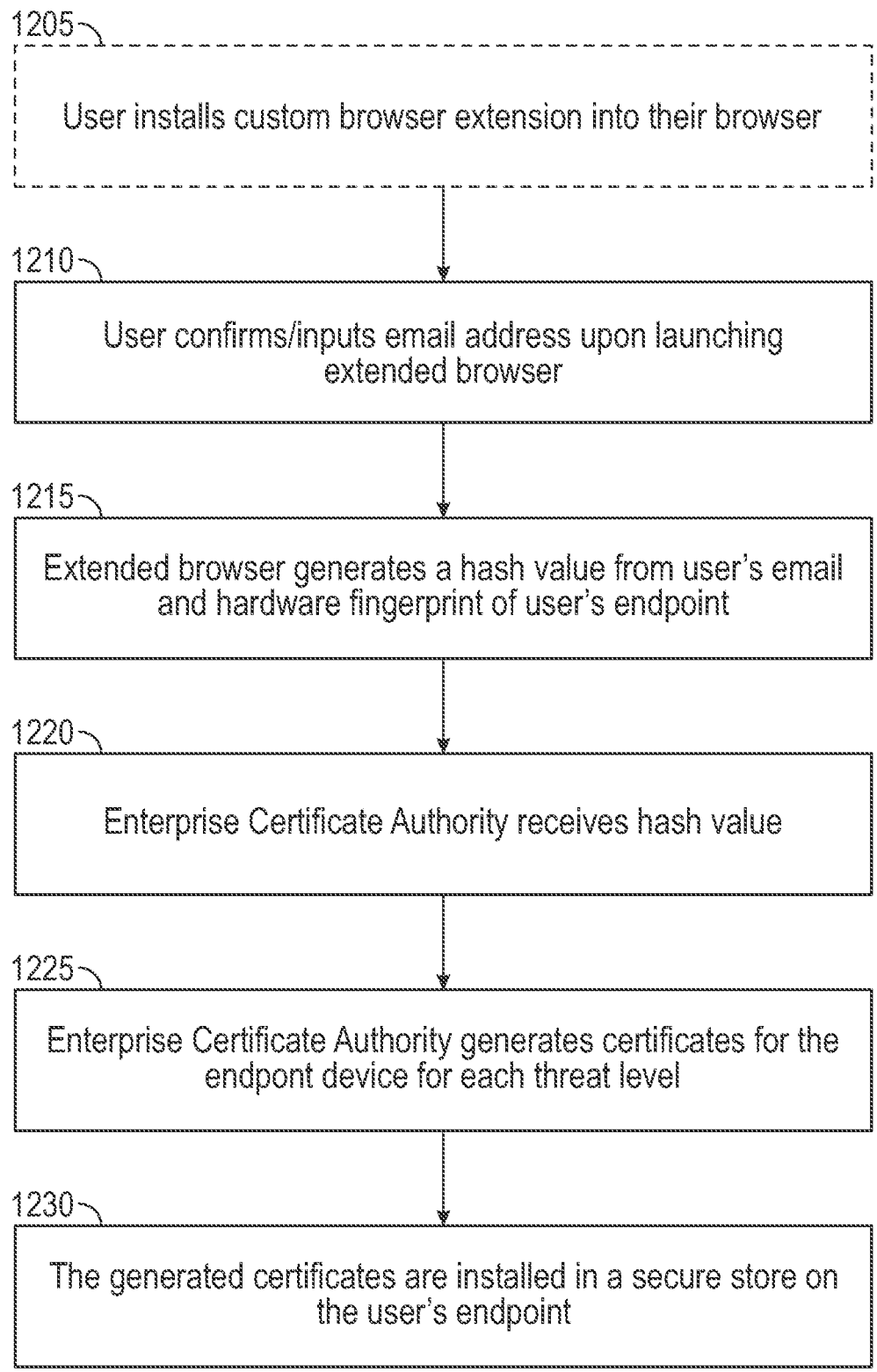
FIG. 12 is a flowchart of a method of generating a set of certification for an endpoint device in accordance with an implementation.

FIG. 12, a flow chart illustrating an example of an algorithm used to generate the certificates for different threat levels, is now described. In one implementation, in step 1205 a user installs the custom browser extensions into their web browser. In step 1210, upon initially launching the extended enterprise browser, the user may be asked to sign-in with their email address. In one implementation, in step 1215 a hash value is generated as a security measure. The hash value may, for example, be generated by browser extensions derived from the user's email and a hardware fingerprint derived from the user's endpoint. This hash value is then communicated in step 1220 to an Enterprise Trusted Certificate Authority (CA) (which may have additional checks to verify if the request is coming from the extensions and not any arbitrary source). In step 1225, the Enterprise CA then generates certificates representing each threat level (e.g., red, orange, yellow, green) which are then installed in step 1230 in a secure store on the user's endpoint.

Enforce Authentication on Web Browser Startup

In one implementation, extended enterprise browser enforces SSO/SAML authentication on web browser startup. In one implementation, the browser extensions modify popular web browsers (e.g., Chromium) in such a way that the enterprise SSO/SAML login screen is the first screen which shows up when the browser is launched. This enforces that the user authenticates with the corporate identity provider before he/she is allowed to enter URLs to access SaaS or Private applications. This step, while optional, is desirable to ensure that the user has passed the SSO authentication before he/she can access any assets. This step helps to ensure that if the user's endpoint is compromised by ransomware/malware, the malicious actor cannot use existing browsers to further compromise enterprise assets.

Lateral Ransomware Propagation Protection

Figure 13A:
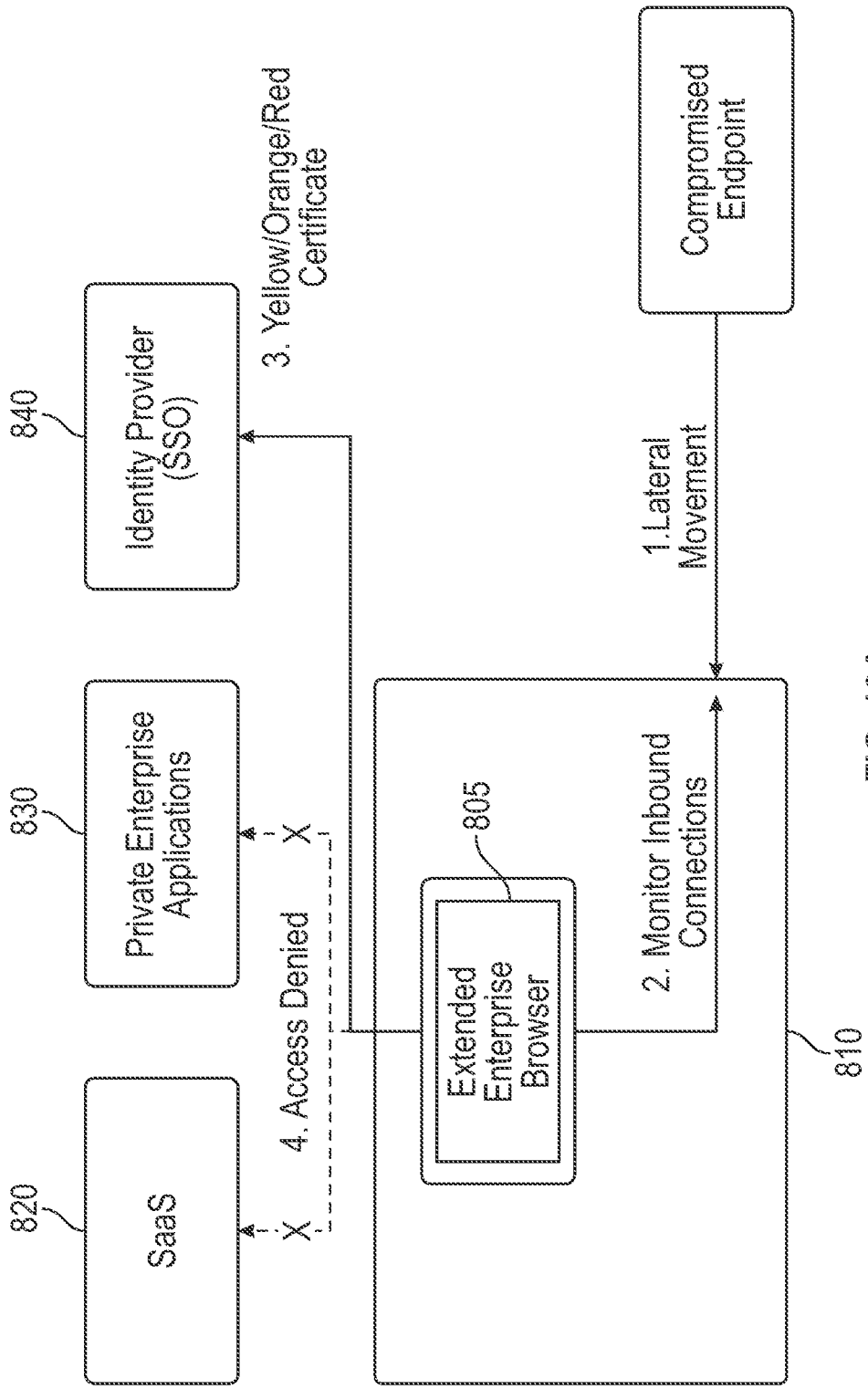
FIG. 13A illustrates an extended enterprise browser monitoring inbound connection for vulnerable protocols associated with lateral movement of ransomware in accordance with an implementation.

Referring to FIG. 13A, in one implementation, the extended enterprise browser is designed to actively monitor the user endpoint for any inbound network connection requests which may indicate the presence of lateral movement of ransomware.

A common step in the ransomware attack kill chain is to laterally move and compromise other endpoints on the local network. Ransomware and other malware often exploit vulnerabilities in remote access protocols, such as the RDP and TeamViewer protocols, to gain control of remote hosts and endpoints. The browser extensions of the extended enterprise browser 105 are designed to allow it to monitor all inbound network connections to the endpoint.

Once the ransomware/malware has gained access to the user's endpoint, it can take advantage of cached credentials in web browsers to gain further access into the corresponding corporate enterprise network and deploy malware and ransomware into corporate assets.

In one implementation, when an inbound network connection is detected from a vulnerable protocol (e.g., remote access protocols such as RDP or TeamViewer), the extended. enterprise browser 805 will serve up the non-compliant endpoint certificate to the Identity provider (SSO) service. This will result in the identity provider automatically denying user access to configured SaaS/private enterprise applications depending on the security policies of the organization.

Figure 13B:
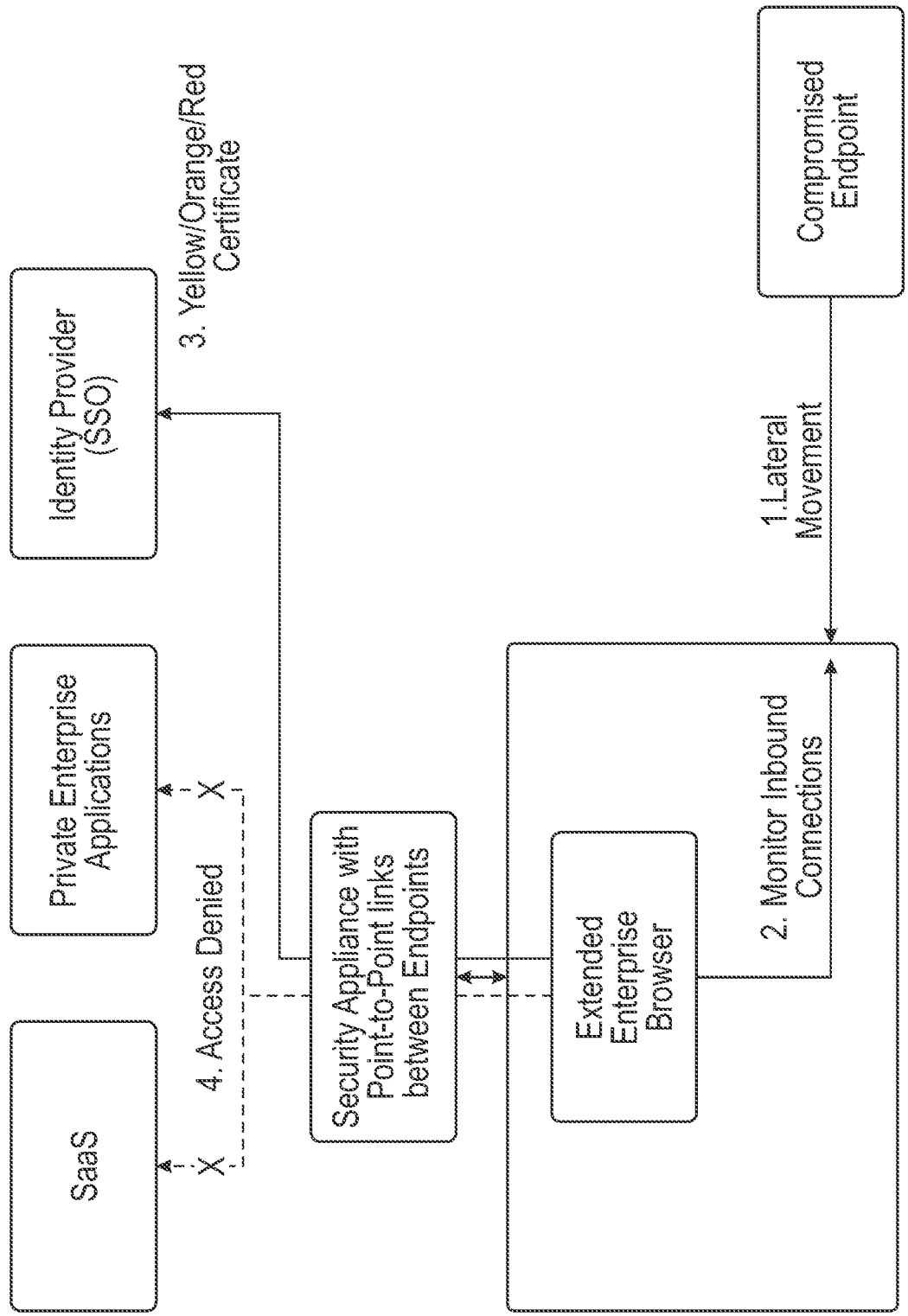
FIG. 13B illustrates the example of FIG. 13A with a security appliance for protection of point-to-point links to endpoints.

Referring to FIG. 13B, the same approach may be applied in combination, if desired, with the previously discussed security appliance.

Figure 14:
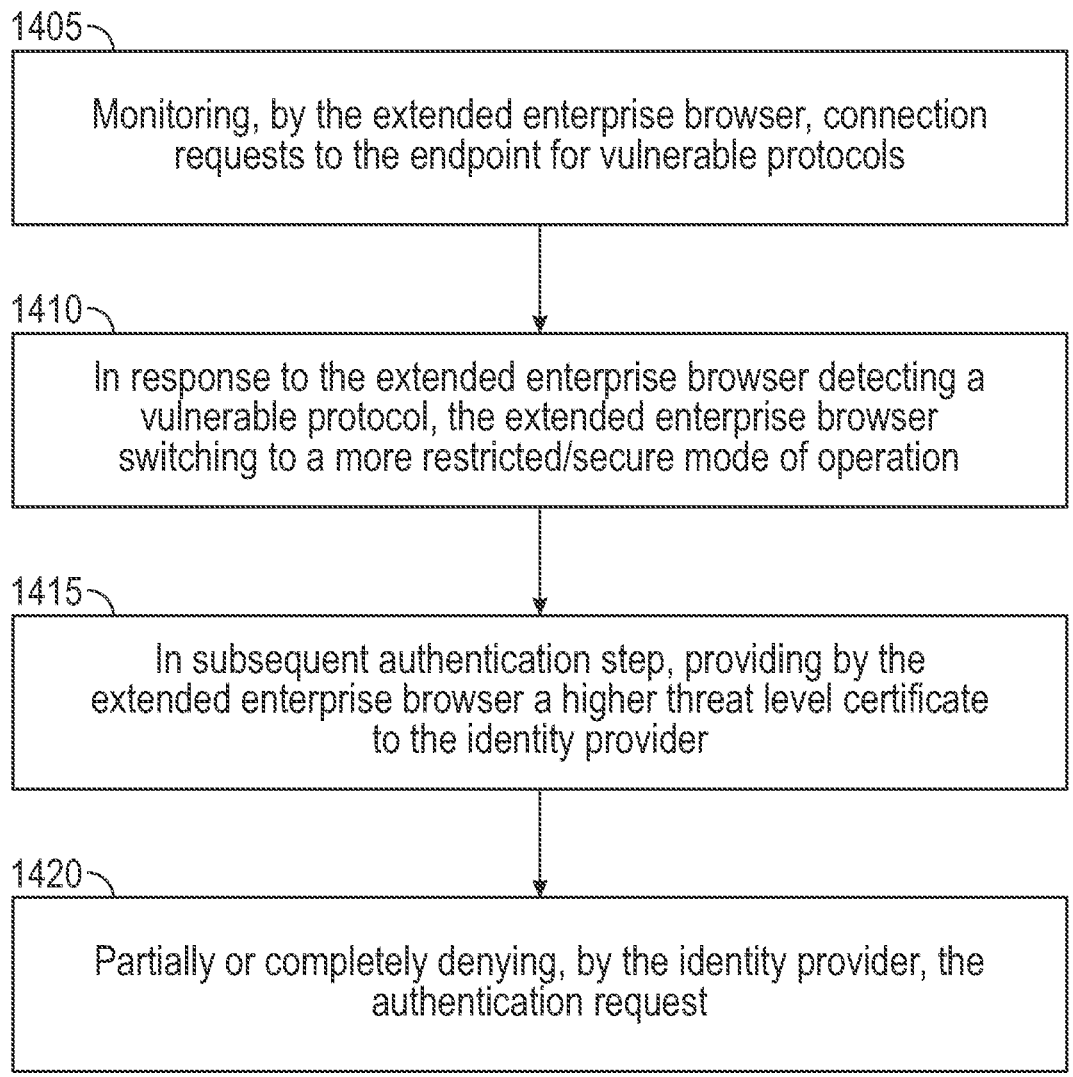
FIG. 14 is a flow chart of a method of protecting against lateral propagation of ransom ware in accordance with an implementation.

Referring to FIG. 14, in one implementation, in step 1405 there is continual monitoring by the extended enterprise browser of inbound connection requests for vulnerable protocols. In step 1410, when an inbound connection request to a vulnerable protocol is detected, in the browser extension, the extended enterprise browser switches to a restricted/secure mode of operation. This may include assigning a higher threat level (e.g., from green to yellow, orange, or red). This could be implemented in a variety of different ways. For example, there may be a. fixed rule for switching to a more secure mode of operation after detecting an inbound connection request for particular vulnerable protocol. For example, a fixed rule for the RDP may mean assigning a threat posture corresponding to a particular threat level (e.g., a red threat level). Alternatively, the extended enterprise browser could bump up or increase its threat posture level from some initial threat posture (e.g., if the threat posture level was green before detecting a vulnerable protocol it may be bumped up one level to yellow after detecting a vulnerable protocol; if the threat posture was yellow before detecting a vulnerable protocol, it may be bumped up to orange after detecting a vulnerable protocol, etc.).

In step 1415, during authentication, the extended web browser uses the certificate appropriate for the more secure mode of operation. In this implementation, when the user attempts to access any SaaS/private enterprise applications, the authentications follow the SSO handshake outlined earlier. In step 1420, the extensions to the web browser send a certificate to the identity provider appropriate for the threat level of the more secure mode of operation (e.g., a yellow, orange or red certificate). The identity provider may partially or completely deny the authentication request, which results in the user being unable to access the SaaS/private enterprise applications.

Rapid Incidence Response

Figure 15A:
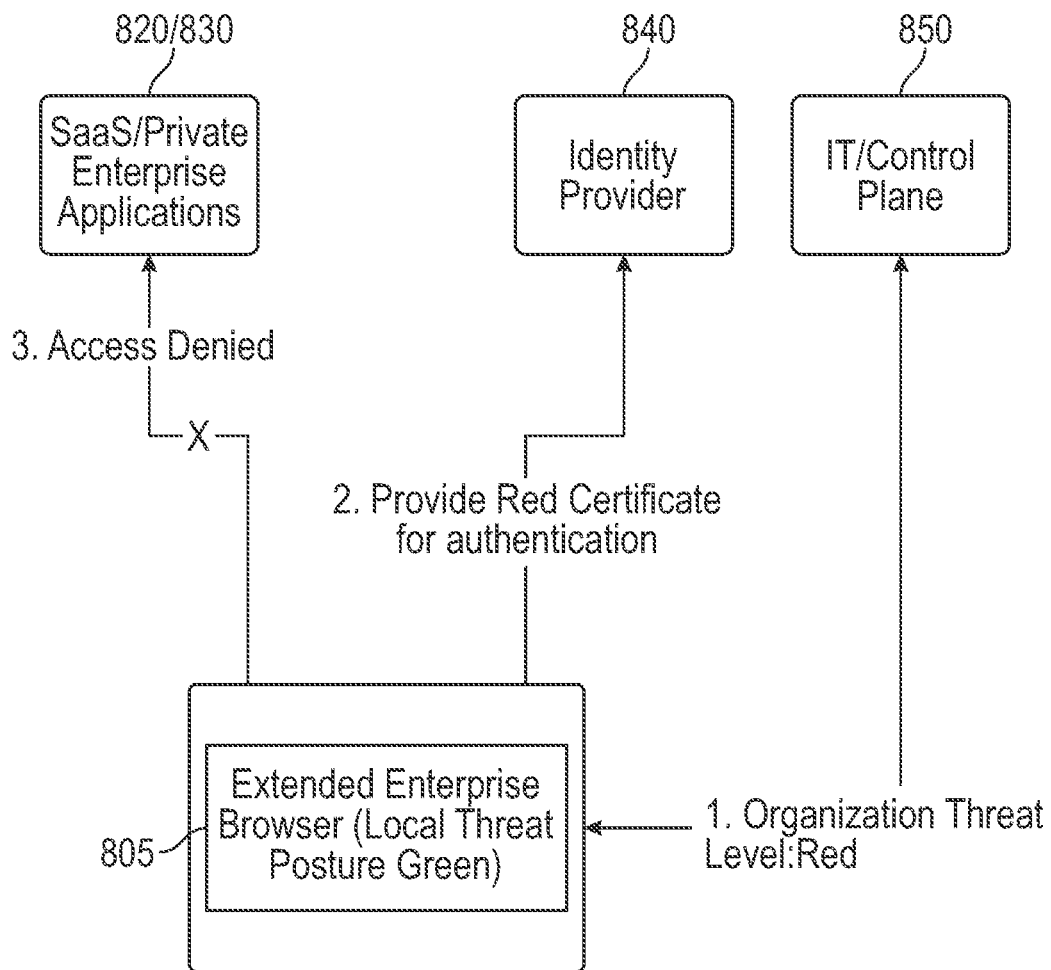
FIG. 15A illustrates an extended enterprise browser having access to SaaS/private enterprise applications reduced or denied depending upon a threat level posture of an enterprise in accordance with an implementation.
Figure 15B:
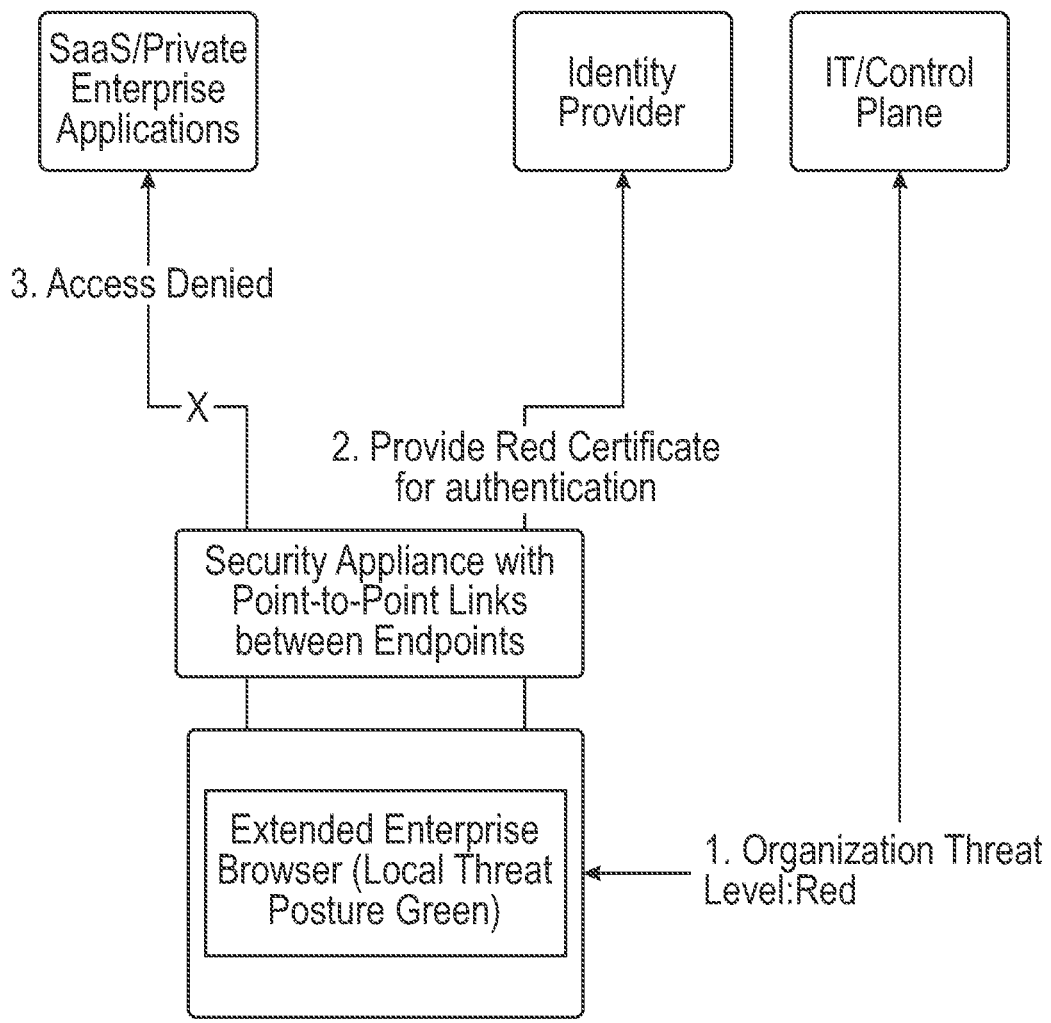
FIG. 15B illustrates the extended enterprise browser of FIG. 15A with a security appliance for protection of point-to-point links to endpoints

FIG. 15A illustrates how the extended enterprise browser 105 can also be extended to enforce access policies to SaaS/private enterprise applications based on the perceived threat level within the enterprise and disallow access to certain known malicious websites or to certain mission critical applications. This can assist organizations in rapid incidence response when a potential threat is detected. FIG. 15B illustrates how the previously discussed security appliance may also be optionally provided.

Figure 16:
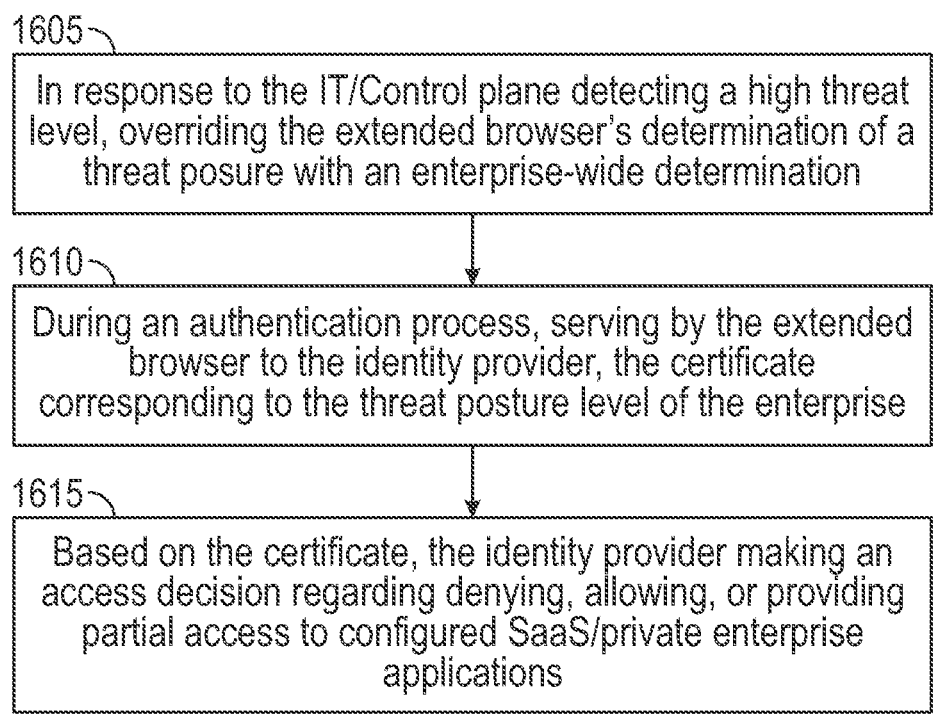
FIG. 16 is a flowchart of a method of denying, allowing, or providing partial access to SaaS/private enterprise applications in accordance with an implementation.

Referring to the flowchart of FIG. 16, the extended enterprise browser can include browser extensions that enforce access policies that, in conjunction with the IT/Control plane and identity provider perform the following rapid incidence response steps. In step 1605, when the IT/Control Plane detects a high threat level, it overrides the web browser's determination of threat posture with the enterprise-wide determination. In step 1610, whenever the user attempts to access a SaaS/private enterprise applications, the browser extension within the extended enterprise browser will serve the color/labeled certificate corresponding to the organization's threat level to the identity provider service, In step 1615, based on the certificate, the identity provider service will deny, allow, or provide partial access to the configured SaaS/private enterprise applications to the end user. In this way, access control to these applications can be enforced based on the perceived threat level from ransomware or other malicious malware.

While FIG. 16 addresses an individual endpoint, it will be understood that an enterprise network there may be many different endpoints. one aspect is that the IT/control plan can control all of the web browsers on an enterprise network. For example, a medium size company may have hundreds of employees that use browsers to access SaaS and private enterprise applications. If each endpoint device has an extended enterprise browser 105 with browser extensions, then when there is heightened level of risk for the enterprise, the IT/control plane may be used to shut down access to SaaS and private enterprise applications that are mission critical to the enterprise, as well as blocking access to sensitive enterprise data stored by SaaS and private enterprise applications.

This supports a mode of rapid incidence response in which, for example, in response to detecting indications of a risk of a ransomware attack the IT/control plane can override the risk assessment of numerous browsers on the enterprise network and project sensitive data and applications.

Monitoring/Stopping Attempts to Use Alternate Browsers

The extended enterprise browser is effective in securing user access to SaaS and/or private enterprise applications. However, these controls become ineffective if the end user chooses to use an alternative browser or uninstalls the extended enterprise browser.

Figure 17:
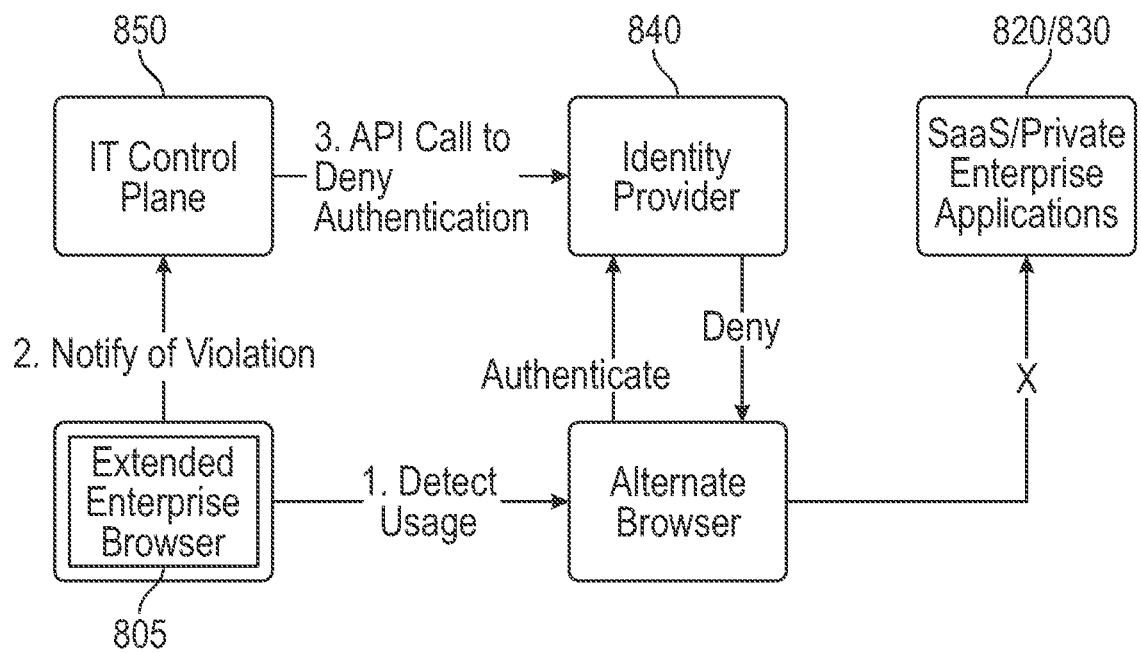
FIG. 17 illustrates an extended enterprise browser detecting alternate browser and taking one or more actions to generate alerts and/or take actions to block use of the alternate browser in accordance with an implementation.

Referring to FIG. 17, to protect against these scenarios, the extended enterprise browser will monitor the user endpoint for installations of alternate web browsers. If any of these installations are detected, then the extended enterprise browser will notify the IT operator against this security violation. Further it will prevent access to private enterprise applications when accessed via the extended enterprise Browser.

This monitoring may be based on the web browser extensions using the Operating Systems APIs or using the open-source OS Query framework, which may be installed on the user endpoint. The browser extensions may then deny access to SaaS/private enterprise applications using the mechanism outlined earlier.

The extensions of the source code of the extended enterprise browser may also periodically send an update to the IT Operational/Control Plane/SIEM systems. If these extensions are uninstalled either by the end user or by malicious ransomware/malware, then the IT Operational/Control Plane will detect the absence of this periodic update and will deny the user any further access to SaaS/private enterprise applications by API integration with the identity provider service.

The extended enterprise browser also periodically sends an update to the IT Operational/Control Plane with information on user endpoints. If the extended enterprise browser is uninstalled either by the end user or by malicious ransomware/malware, then the IT Operational/Control Plane will detect the absence of this periodic update and will deny the user any further access to private enterprise applications. In response, the identity provider may partially or completely deny the authentication request. This results in the user being unable to access the SaaS/private enterprise applications.

Figure 18:
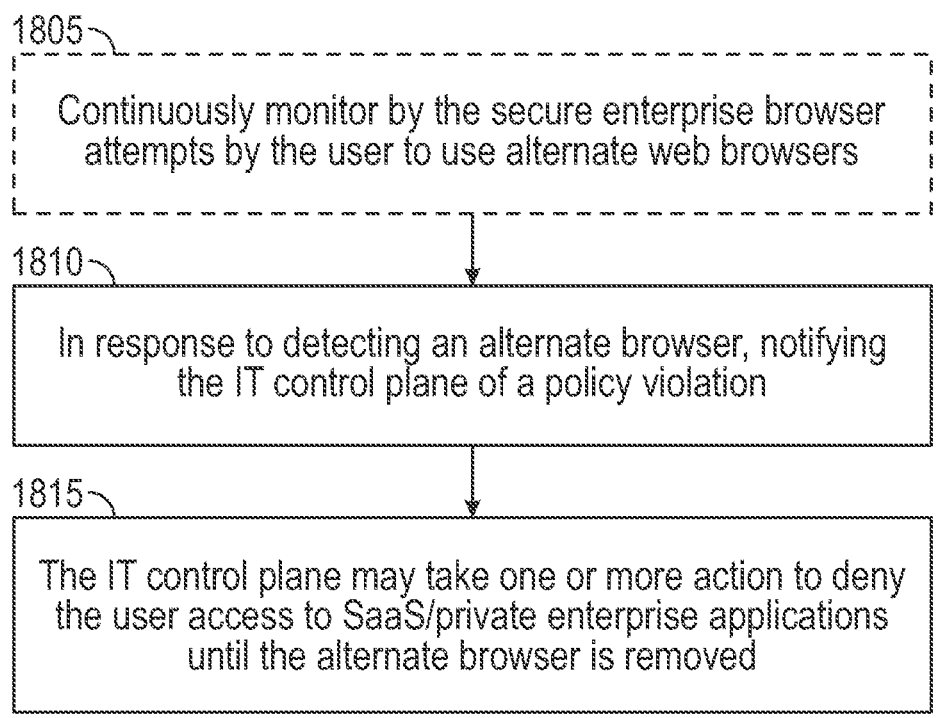
FIG. 18 is a flowchart of a method of forcing removal of an alternate browser in accordance with an implementation.

FIG. 18 illustrates an example method. In step 1805, the extended enterprise browser continuously monitors and detects attempts by the user to alternate web browsers. In step 1810 in response to detecting an alternate browser, the extended enterprise browser notified the IT control plane of the policy violation. In step 1815, the IT/Control plane may take one or more actions to enforce compliance by the user and/or prevent ransomware attacks. For example, the IT/control plane may use an API call into the Identity provider to deny further authenticated access to the users. This would result in the user being unable to access any SaaS/private enterprise applications until the alternate browser is removed.

The following sections elaborate on how the proposed extensions to the web browser would detect attempts at lateral propagation of ransomware or malware and deny user access to SaaS/private enterprise applications.

Control Access to Applications Based on User Identity

Figure 19:
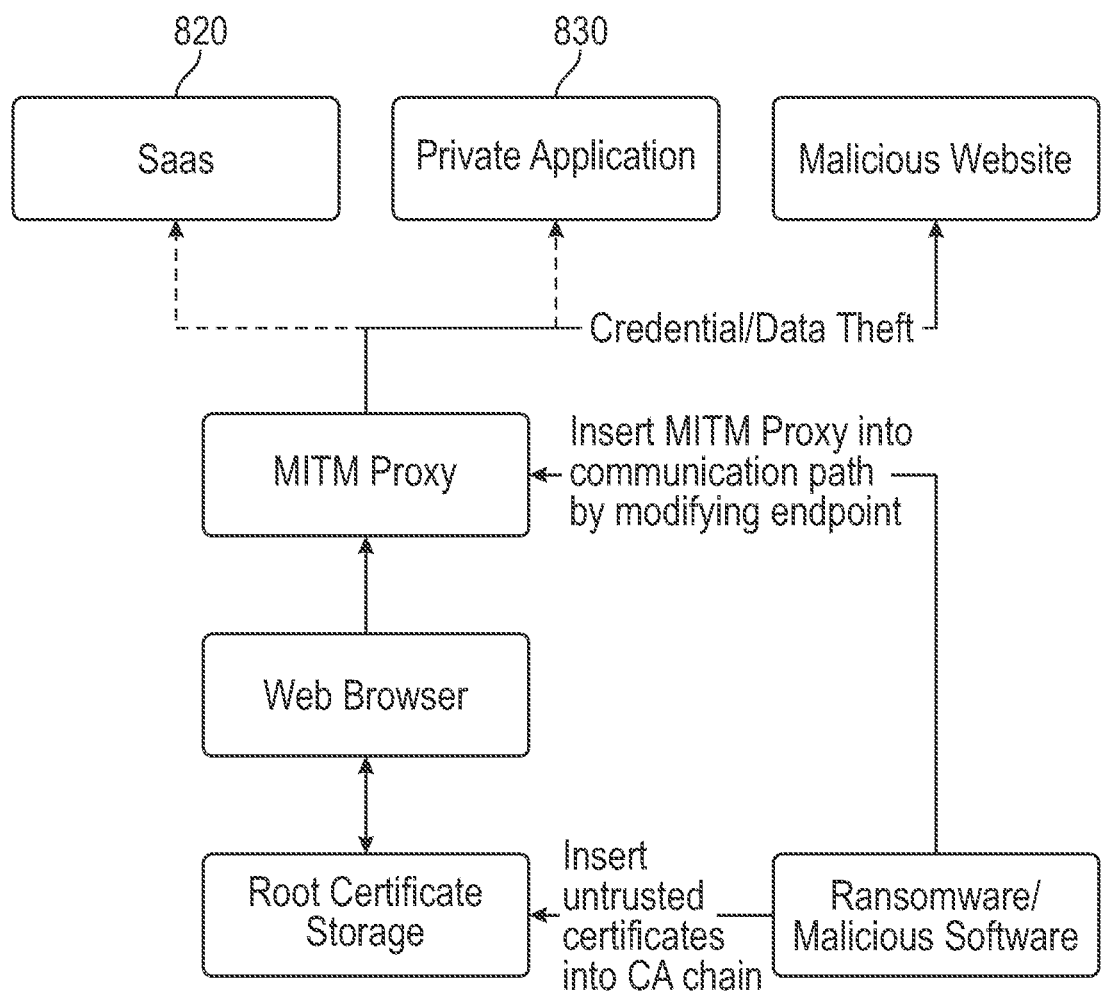
FIG. 19 illustrates a conventional man in the middle ransomware attack with credential theft.

Referring to FIG. 19, a common attack methodology adopted by ransomware is to tamper with the trusted root certificate chain stored on the endpoint and insert untrusted certificates into this. The endpoint is then modified to access SaaS and private applications via a malicious man in the middle(MITM) proxy inserted into the access path. Since the user web browser needs to trust the root certificate chain of the MITM proxy, the ransomware or malicious software inserts untrusted root certificates into the endpoints certificate storage. This makes it possible to redirect the user to a malicious website that may result in credential theft and data exfiltration as shown in FIG. 19.

Figure 20A:
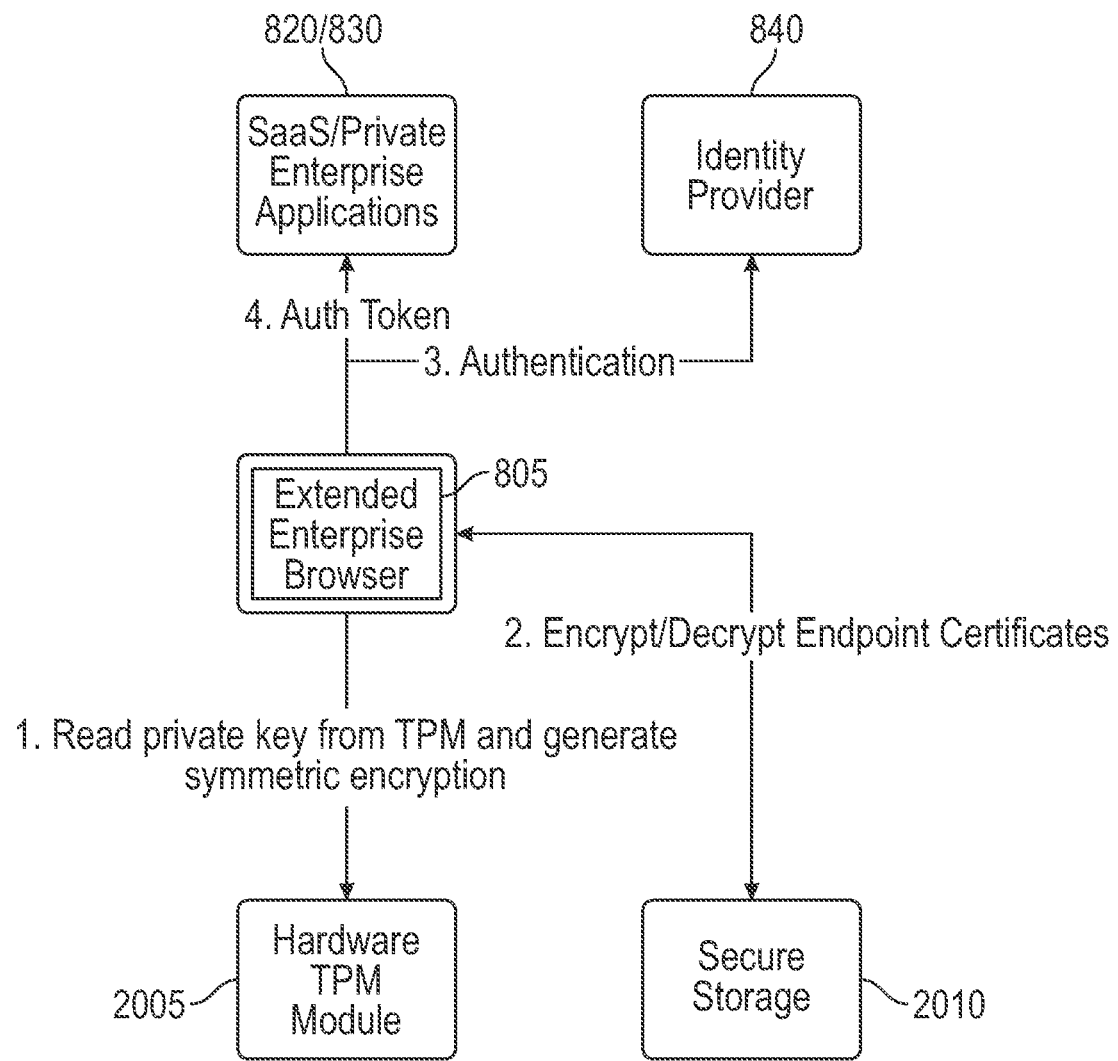
FIG. 20A illustrates an example of using additional trusted platform module in combination with an extended enterprise browser to increase ransomware protection in accordance with an implementation.

Referring to FIG. 20A, to mitigate against these kinds of attacks, endpoint certificates can further be associated with the hardware TPM (Trusted Platform Module) 2005 to further restrict access to certain SaaS/private enterprise applications. The Trusted Platform Module is a secure crypto-processor chip designed to make it tamper resistant from malicious software. The TPM can be used to strongly protect certificates and RSA keys from tampering by malicious software and malware.

In one implementation, the algorithm encrypts/decrypts endpoint certificates on secure storage 2010.

Figure 20B:
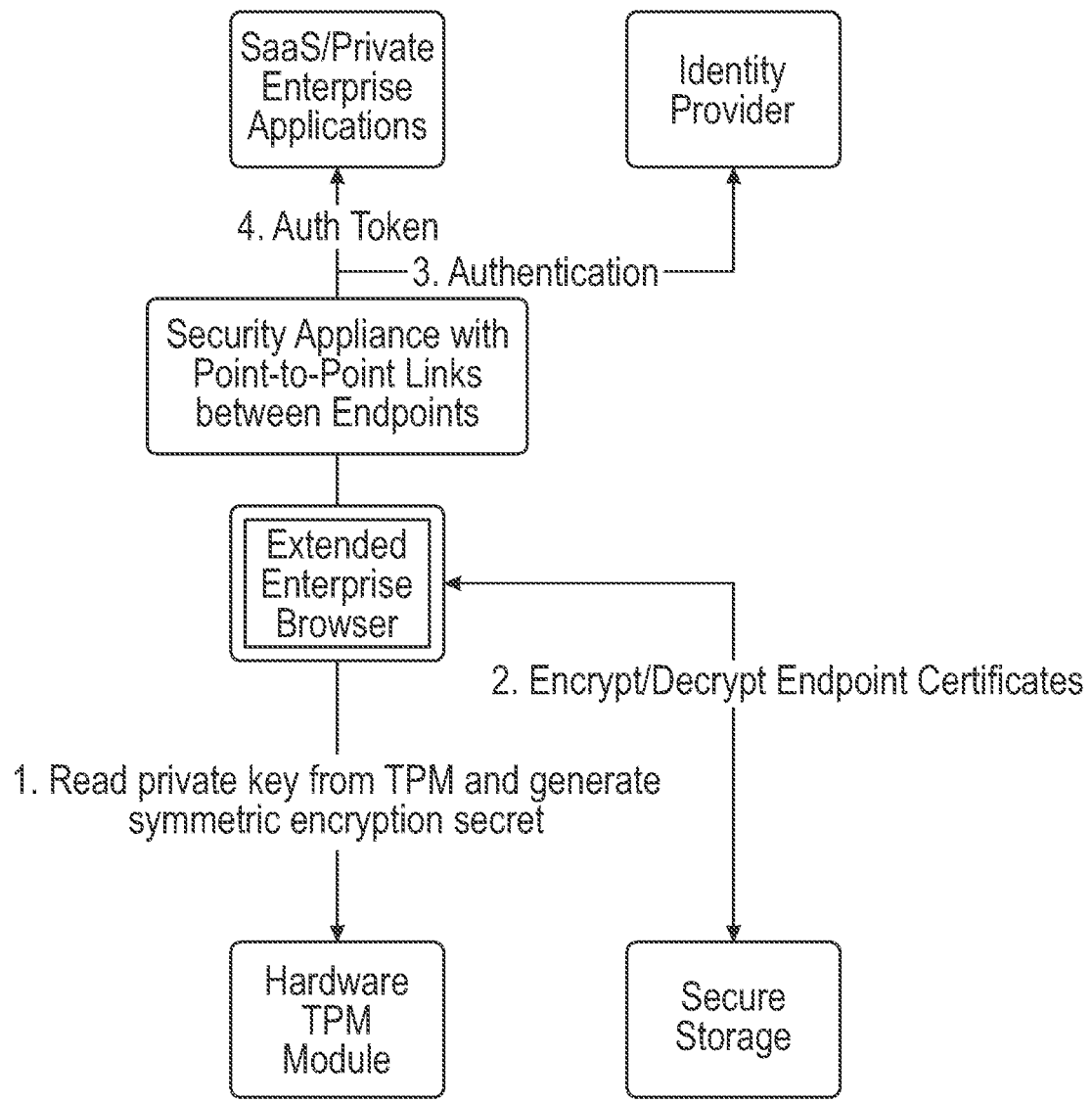
FIG. 20B illustrates the example of FIG. 20A with an additional security appliance for protection of point-to-point links to endpoints.

FIG. 20 B illustrates how the previously discussed security appliance may also optionally provide additional protection from lateral propagation of ransomware.

Figure 21:
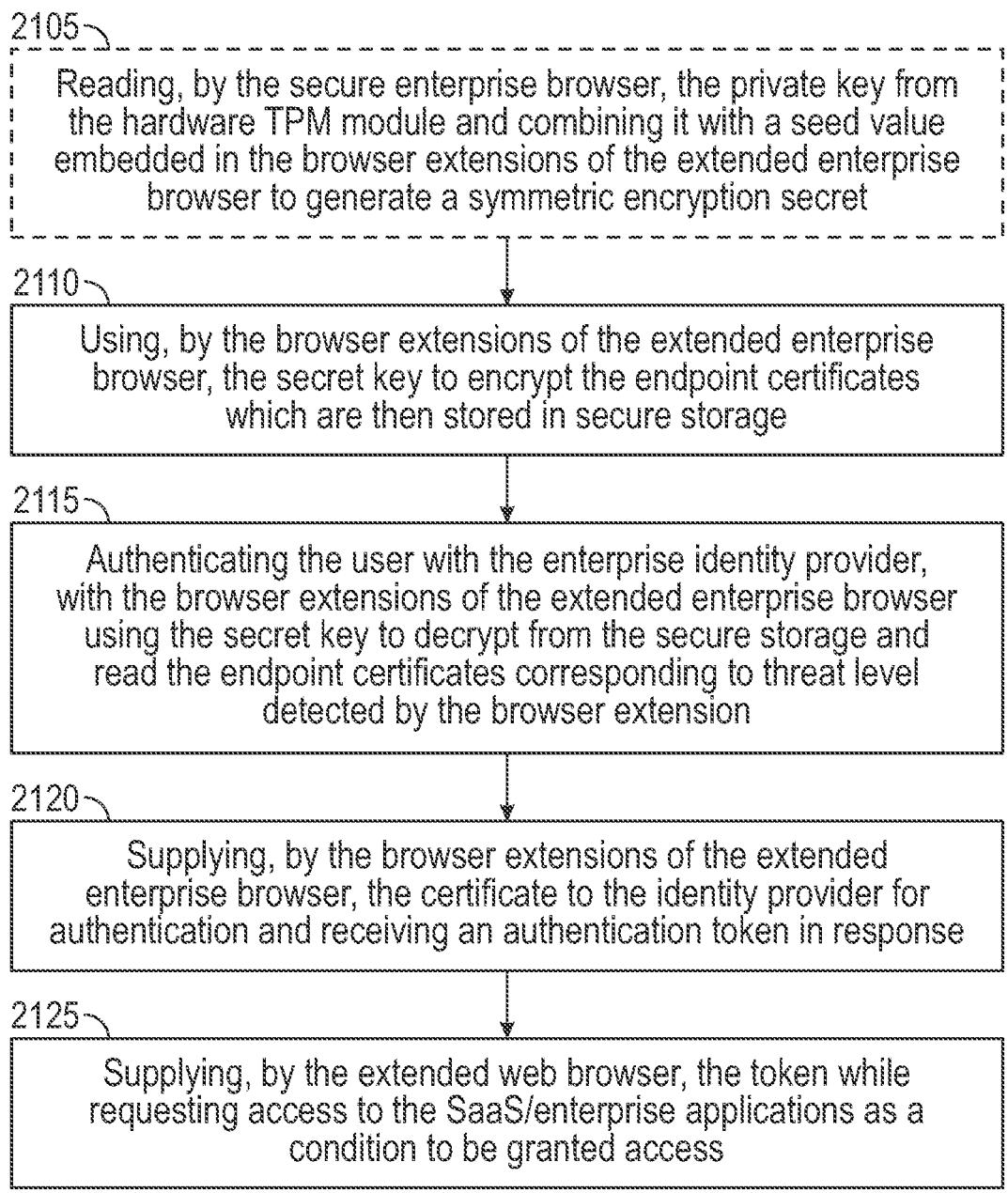
FIG. 21 is a flow chart of a method to use TPM and an extended enterprise browser in combination in accordance with an implementation.

FIG. 21 is a flowchart of a method to encrypt/decrypt endpoint certificates that have been received from the CA based on a secret key generated from the hardware TPM module on the user's endpoint. In step 2105, extended enterprise browser reads the private key from the hardware TPM module. This private key is combined with a seed value embedded in the browser extensions to generate a symmetric encryption secret. This ensures that this secret key cannot be compromised or used by a malicious attacker or ransomware.

In step 2110, this secret key is used by the browser extensions to encrypt the endpoint certificates which are then stored in secure storage.

In step 2115, when the user authenticates with the enterprise identity provider, the browser extensions use the secret key to decrypt from the secure storage and read the endpoint certificates corresponding to threat level detected by the extension.

In step 2120, the browser extensions then supply the certificate to the identity provider for authentication and receives an authentication token in response.

In step 2125, the secure web browser supplies this token while requesting access to the SaaS/enterprise applications and is granted access.

Some examples of the benefits of the extended enterprise browser will now be discussed.

Current industry approaches to protect are endpoint protection solutions such as EDR companies (e.g., CrowdStrike®, Sentinel One® etc.). But they are focused on endpoint protection in terms of generating an alert. Existing approaches used by Endpoint Detect & Response (EDR) security companies involve an agent or a client deployed on the endpoint machine to report threat posture to the security provider, who then controls access to SaaS/Private applications by integrating with the identity provider. Such EDR approaches do not directly address the problem of sensitive business data getting exfiltrated or encrypted by ransomware. For example, business data may reside on SaaS (office.com, salesforce.com etc.) applications or private enterprise (databases, HR and ERP systems) applications. The web browser is the "modern de facto client" to access these kinds of applications and thus a potential attack vector that can be exploited by ransomware. Proactively preventing ransomware from acquiring access to the credentials needed to access SaaS and private enterprise applications is a superior approach to generating alerts as in EDR.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Overall Network Protection

As previously discussed, the security appliance provides protection against lateral ransomware propagation. The endpoints may be deployed under a default gateway with point to point links. The extended browser provided an additional type of complementary protection. Every endpoint device in an enterprise could be upgraded to use the extended enterprise browser. However, it may be possible in some end-use applications that only some employees have their endpoint device so upgraded (e.g., only for employees using SaaS and private business application as one possibility).

It will be understood that in theory some types of information from security applicant, such as alerts about lateral propagation of ransomware, could be provided to the IT/control plane and used as a factor in determining an overall threat posture. That is, in theory some types of alert information generated by the security appliance could be used to make decisions in operating the extended browser.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, hut not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method of protecting against lateral propagation of ransomware, comprising:
    utilizing an extended enterprise browser, installed on an endpoint device of an enterprise network environment, to block ransomware attacks on private enterprise applications or SaaS applications;
    monitoring, by the extended enterprise browser, for alternate browsers installed on the endpoint device;
    in response to the extended enterprise browser detecting an alternate browser, taking at least one action to block the spread of ransomware by the alternate browser;
    wherein the endpoint device is provisioned with at least two different client certificates for authentication, and the extended enterprise browser selects a certificate to be used during identity authentication based on a ransomware risk level.

2. The method of claim 1, wherein the at least one action comprises generating an alert.

3. The method of claim 1, wherein the at least one action comprises the extended enterprise browser taking an action to block access of the alternate browser to private enterprise applications.

4. The method of claim 1, wherein the at least one action comprises the extended enterprise browser taking an action to block access of the alternate browser to SaaS Applications.

5. The method of claim 1, wherein the at least one action comprising the extended enterprise browser communicating during an authentication step that the endpoint is untrustworthy.

6. The method of claim 1, wherein the endpoint device is one of a plurality of endpoint devices in a Virtual Local Area Network (VLAN) having a security applicant configured as a default gateway for intra-VLAN communication of the plurality of endpoint devices using a subnet mask of 255.255.255.255.

7. The method of claim 1, wherein the endpoint device is one of a plurality of endpoint devices in a Virtual Local Area Network (VLAN) deployed under a default gateway with point to point links.

8. A method of protecting against ransomware, comprising:
    provisioning an endpoint device with a plurality of different certificates for identity authentication corresponding to certificate for a range of different ransomware risk posture levels;
    utilizing an extended enterprise browser, installed on the endpoint device, to select which certificate, from the plurality of different certificates associated with different ransomware risk posture levels, is to be provided to an identity provider during an identity authentication step;
    monitoring, by the extended enterprise browser, for alternate browsers installed on the endpoint device; and
    in response to the extended enterprise browser detecting an alternate browser, taking at least one action to stop the alternate browser from accessing at least one of SaaS application and private enterprise applications.

9. The method of claim 8, wherein the extended enterprise browser blocks ransomware attacks of private enterprise applications and SaaS application.

10. The method of claim 8, wherein the at least one action comprises generating an alert.

11. The method of claim 8, wherein the at least one action comprises the extended enterprise browser taking an action to block access of the alternate browser to private enterprise applications.

12. The method of claim 11, wherein the at least one action comprising the extended enterprise browser communicating during an authentication step that the endpoint is untrustworthy.

13. A system, comprising:
    an endpoint device of an enterprise network environment;
    an extended enterprise browser installed on the endpoint device to block ransomware attacks on private enterprise applications or SaaS applications, the extended enterprise browser monitoring, for alternate browsers installed on the endpoint device and in response to the extended enterprise browser detecting an alternate browser, taking at least one action to block the spread of ransomware by the alternate browser;
    wherein the endpoint device is provisioned with at least two different client certificates for authentication, and the extended enterprise browser selects a certificate to be used during identity authentication based on a ransomware risk level.

14. The system of claim 13, wherein the at least one action comprises the extended enterprise browser taking an action to block access of the alternate browser to private enterprise applications.

15. The system of claim 13, wherein the at least one action comprises the extended enterprise browser taking an action to block access of the alternate browser to SaaS Applications.

16. The system of claim 13, wherein the at least one action comprises the extended enterprise browser communicating during an authentication step that the endpoint is untrustworthy.

17. The system of claim 16, wherein the at least one action comprises generating an alert.

18. A system for providing protection from ransomware attacks, comprising:
- a Virtual Local Area Network (VLAN) apparatus of a VLAN access or trunk port, the VLAN apparatus including a security appliance configured as a default gateway for intra-VLAN communication of a plurality of endpoint devices using a subnet mask of 255.255.255.255;
- the security appliance configured to monitor intra-VLAN message traffic, allow only authorized intra-VLAN communication and detect lateral propagation of ransomware; and
- an extended enterprise browser installed on at least one of the plurality of endpoint devices to block ransomware attacks of private enterprise applications or SaaS applications, the extended enterprise browser monitoring, for alternate browsers installed on the endpoint device and in response to the extended enterprise browser detecting an alternate browser, taking at least one action to block the spread of ransomware by the alternate browser.

* * * * *